US011779033B2

(12) United States Patent
Scionti

(10) Patent No.: US 11,779,033 B2
(45) Date of Patent: Oct. 10, 2023

(54) PROCESS OF MANUFACTURING EDIBLE MICROEXTRUDED PRODUCT COMPRISING PROTEIN, COMPOSITION THEREBY OBTAINED AND THE USE THEREOF

(71) Applicant: NOVAMEAT TECH, S.L., Barcelona (ES)

(72) Inventor: Giuseppe Scionti, Barcelona (ES)

(73) Assignee: NOVAMEAT TECH, S.L., Barcelona (ES)

( * ) Notice: Subject to any disclaimer, the term of this patent is extended or adjusted under 35 U.S.C. 154(b) by 192 days.

(21) Appl. No.: 17/265,176

(22) PCT Filed: Aug. 6, 2019

(86) PCT No.: PCT/EP2019/071093
§ 371 (c)(1),
(2) Date: Feb. 1, 2021

(87) PCT Pub. No.: WO2020/030628
PCT Pub. Date: Feb. 13, 2020

(65) Prior Publication Data
US 2021/0345643 A1 Nov. 11, 2021

(30) Foreign Application Priority Data
Aug. 7, 2018 (EP) .................................... 18382598

(51) Int. Cl.
*A23J 3/26* (2006.01)
*B33Y 10/00* (2015.01)
(Continued)

(52) U.S. Cl.
CPC . *A23J 3/26* (2013.01); *A23J 3/04* (2013.01); *A23J 3/14* (2013.01); *A23J 3/227* (2013.01);
(Continued)

(58) Field of Classification Search
CPC ........ A23J 3/26; A23J 3/04; A23J 3/14; A23J 3/227; B33Y 10/00; B33Y 70/00;
(Continued)

(56) References Cited

U.S. PATENT DOCUMENTS 4,423,083 A 12/1983 Shenouda
5,213,829 A 5/1993 Cox et al.
(Continued)

FOREIGN PATENT DOCUMENTS

CN 105454446 A 4/2016
CN 107072245 A 8/2017
(Continued)

OTHER PUBLICATIONS

WO 2016/150960—Machine Translation. (Year: 2016).*
(Continued)

*Primary Examiner* — Hamid R Badr
(74) *Attorney, Agent, or Firm* — Squire Patton Boggs (US) LLP

(57) ABSTRACT

The invention relates to edible microextruded products with compressive and tensile Young's moduli resembling the mechanical properties of meat, said edible products comprising several layers of microextruded elements made of a viscoelastic composition, said viscoelastic composition comprising in an appropriate edible solvent, high amounts of protein and an edible pseudoplastic polymer. The invention discloses also particular processes for obtaining such edible microextruded products, in particular a 3D printing method. Particular uses of edible products are also listed, including the use as meat-replacers. The invention discloses also new edible viscoelastic compositions comprising proteins and pseudoplastic polymers.

19 Claims, 11 Drawing Sheets

(51) Int. Cl.
| | |
|---|---|
| B33Y 70/00 | (2020.01) |
| B33Y 80/00 | (2015.01) |
| A23P 20/20 | (2016.01) |
| A23L 29/256 | (2016.01) |
| A23L 29/269 | (2016.01) |
| A23J 3/04 | (2006.01) |
| A23J 3/14 | (2006.01) |
| A23J 3/22 | (2006.01) |
| A23P 20/25 | (2016.01) |

(52) U.S. Cl.
CPC ........... *A23L 29/256* (2016.08); *A23L 29/272* (2016.08); *A23P 20/20* (2016.08); *B33Y 10/00* (2014.12); *B33Y 70/00* (2014.12); *B33Y 80/00* (2014.12); *A23P 2020/253* (2016.08); *A23V 2002/00* (2013.01)

(58) Field of Classification Search
CPC .... B33Y 80/00; A23P 20/20; A23P 2020/253; A23L 29/256; A23L 29/272; A23V 2002/00
USPC ......................................................... 426/657
See application file for complete search history.

(56) References Cited

U.S. PATENT DOCUMENTS

| | | | |
|---|---|---|---|
| 8,703,216 | B2 | 4/2014 | Forgacs et al. |
| 9,808,029 | B2 | 11/2017 | Fraser et al. |
| 2007/0269571 | A1 | 11/2007 | Akita et al. |
| 2014/0193547 | A1 | 7/2014 | Brown et al. |
| 2016/0106142 | A1 | 4/2016 | Contractor et al. |
| 2016/0135493 | A1 | 5/2016 | Kuo et al. |
| 2017/0035076 | A1 | 2/2017 | Geistlinger et al. |
| 2017/0164650 | A1 | 6/2017 | Diaz et al. |
| 2017/0251713 | A1 | 9/2017 | Warner et al. |
| 2018/0192686 | A1 | 7/2018 | Shoseyov et al. |
| 2018/0199614 | A1 | 7/2018 | Zhang et al. |

FOREIGN PATENT DOCUMENTS

| | | |
|---|---|---|
| JP | 2013/067019 A | 4/2013 |
| WO | WO 2007/013146 A1 | 1/2007 |
| WO | WO 2008/124629 A1 | 10/2008 |
| WO | WO 2016/035059 A2 | 3/2016 |
| WO | WO 2016/150960 A1 | 9/2016 |

OTHER PUBLICATIONS

International Search Report and Written Opinion dated Sep. 4, 2019 for International Application No. PCT/EP2019/071093, 16 pages.
Axpe, et al: "Applications of Alginate-Based Bioinks in 3D Bioprinting", International Journal of Molecular Sciences; Nov. 25, 2016; vol. 17(12); pp. 1-11.
Chen, et al: "Ultrasound elasticity measurements of beef muscle" IEEE Ultrasonics Symposium 1994 ULTSYM-94; vol. 3, pp. 1459-1462; doi: 10.1109/ULTSYM.1994.401867.
Chen, et al: "Young's modulus measurements of soft tissues with application to elasticity imaging", IEEE Transactions on Ultrasonics, Ferroelectrics, and Frequency Control; Jan. 1, 1996; vol. 43(1), pp. 191-194; doi: 10.1109/58.484478.
Chien, et al: "Three-dimensional printing of soy protein scaffolds fortissue regeneration", Mary Ann Liebert, Inc. Mary Ann Liebert, Inc., Tissue Engineering Part C 2013; vol. 19(6), pp. 417-426.
Feng, et al: "Materials Properties of Printable Edible Inks and Printing Parameters Optimization during 3D Printing: a review", Critical Reviews in Food Science and Nutrition; Jun. 20, 2018, pp. 1-8.
Freeman, et al: "Tuning Alginate Bioink Stiffness and Composition for Controlled Growth Factor Delivery and to Spatially Direct MSC Fate within Bioprinted Tissues", Scientific Reports; Dec. 6, 2017; vol. 7, Article No. 17042, pp. 1-12.
Jahanbakhshian, et al: "Measurement and prediction of the mechanical properties of a two-component food during freezing", International Journal of Food Properties 2017; vol. 20(3), pp. S3088-S3095; doi: 10.1080/10942912.2016.1247856.
Kim, et al: "Classification of the printability of selected food for 3D printing: Development of an assessment method using hydrocolloids as reference material", Journal of Food Engineering; Jul. 24, 2017; vol. 215, pp. 23-32.
Krintiras, et al: "On the use of Couette Cell technology for large scale production of textured soy-based meat replacers", Journal of Food Engineering 2016; available online Aug. 25, 2015; vol. 169, pp. 205-213.
Lapin, et al: "Substrate elasticity affects bovine satellite cell activation kinetics in vitro", Journal of Animal Science 2013; vol. 91(5), pp. 2083-2090, doi: 10.2527/jas.2012-5732.
Lille, et al: "Applicability of protein and fibre-rich food materials in extrusion-based 3D printing", Journal of Food Engineering 2017, http://dx.doi.org/10.1016/i.ifoodeng.2017.04.034, 8 pages.
Lipton, et al: "Additive manufacturing for the food industry", Trends in Food Science and Technology 2015; vol. 43(1), pp. 114-123.
Liu, et al: "3D printing: Printing precision and application in food sector", Trends in Food Science and Technology; Sep. 1, 2017; vol. 69, pp. 83-94.
Ogawa, et al: "Measurement of Young's Modulus and Poisson's Ratio of Tuna Fish", Transactions of the Japan Society of Refrigerating and Air Conditioning Engineers 2011, vol. 9(3), pp. 283-290, with English translation, 18 pages.
Segars, et al: "Textural characteristics of beef muscles", Journal of Texture Studies 1974; vol. 5, pp. 283-297; doi: 10.1111/j.1745-4603.1974.tb01436.x.
Severini, et al: "Variables affecting the printability of foods: Preliminary tests on Cereal-based products", Innovative Food Science and Emerging Technologies 2016; vol. 38 Part A, pp. 281-291.
Third Party Observations dated Jul. 5, 2020 for International Application No. PCT/EP2019/071093, 7 pages.
U-Chupaj, et al: " Differences in textural properties of cooked caponized and broiler chicken breast meat", Poultry Science; Jul. 1, 2017, vol. 96(7), pp. 2491-2500; doi: 10.3382/ps/pex006.
Van Nunen, et al: "3-D Meat Printer | Just another weblog", https://meat2015.weblog.tudelft.nl/; Oct. 29, 2015; 17 pages.
Yissum Research Development Company: "Yissum will unveil new technology for 3D printed food", https://3dadept.com/yissum-will-unveil-new-technology-for-3d-printed-food/; Oct. 24, 2017; 3 pages.
Communication pursuant to 94(3) EPC dated Jun. 13, 2023 forwarding the examination report for European Patent Application No. 19746506.5; 5 pages.
First Notice of Review dated Jul. 8, 2023 issued for Chinese Patent Application No. 201980051530X; with English translation, 39 pages.
Search Report dated Jul. 6, 2023 issued for Chinese Patent Application No. 201980051530X; with English translation, 8 pages.
Notification of Reasons for Refusal dated Jul. 11, 2023 issued for Japanese Patent Application No. 2021-506678; with English translation, 8 pages.

\* cited by examiner

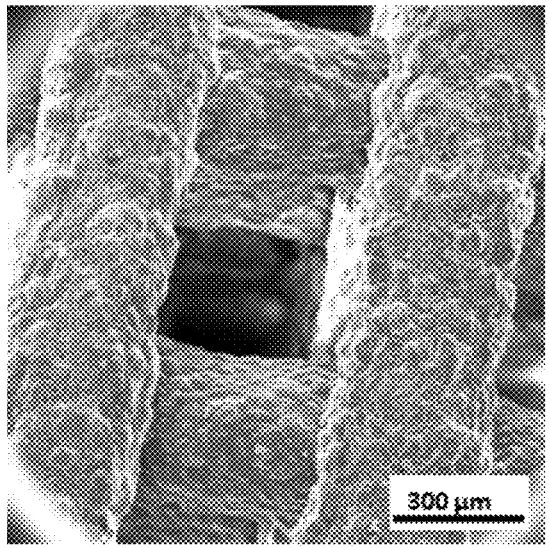 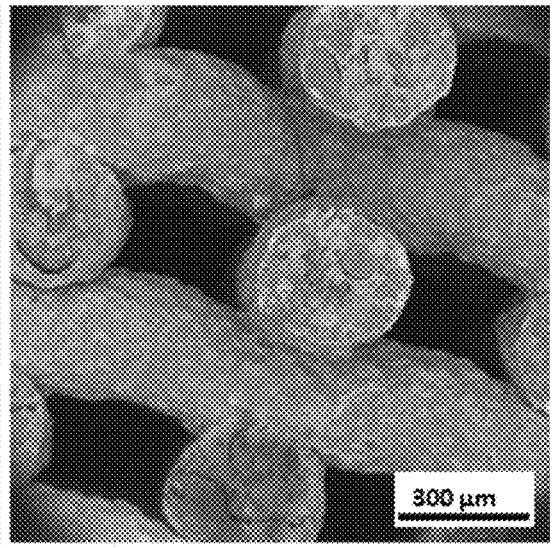
FIG. 10A　　　　　　　　　　FIG. 10B
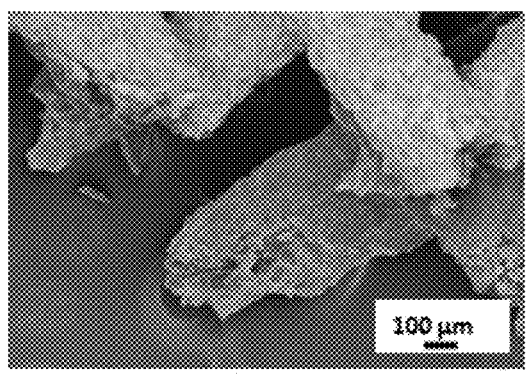 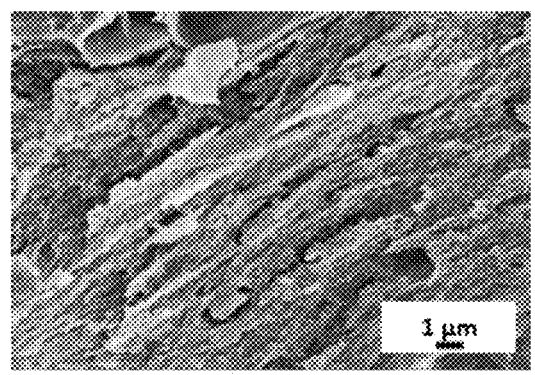
FIG. 11A　　　　　　　　　　FIG. 11B

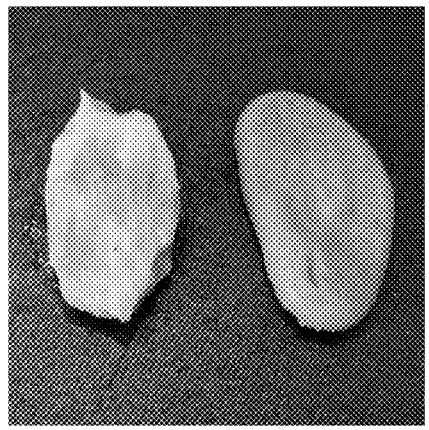 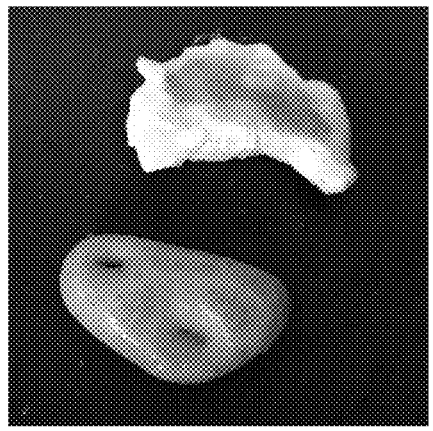
FIG. 14A  FIG. 14B
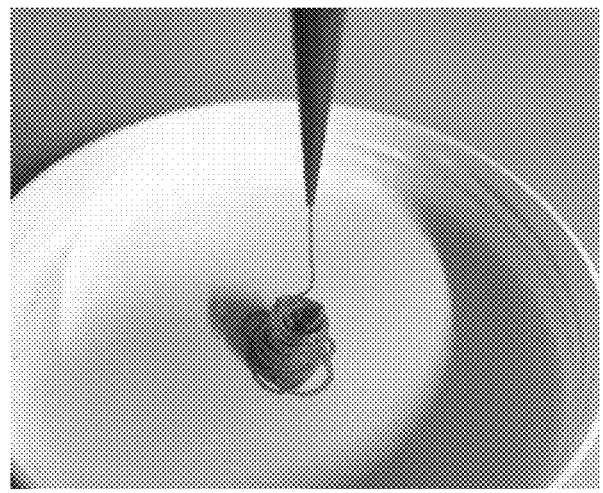
FIG. 15

PROCESS OF MANUFACTURING EDIBLE MICROEXTRUDED PRODUCT COMPRISING PROTEIN, COMPOSITION THEREBY OBTAINED AND THE USE THEREOF

CROSS-REFERENCE

This application is a 35 USC 371 national phase filing of PCT/EP2019/071093 filed on Aug. 6, 2019, which claims the benefit of and priority to European Patent Application 18382598.3 filed on Aug. 7, 2018, both applications are incorporated herein by reference in their entirety.

TECHNICAL FIELD

Present invention relates to the field of food industry. In particular to the field of protein-based products as meat replacers and customizable food.

BACKGROUND ART

Proteins are basic components in all living organisms, and protein nutrients for a healthy diet can be obtained by foods from both animal and plant origin. According to the "Health Promotion and Disease Prevention Knowledge Gateway" report of the European Commission's Science and Knowledge Service (2017), a mixed diet comprising different protein nutrients is fundamental for the human body correct functioning, providing the conditions for the body's enzymatic activity, immunity, cell signalling, and muscle work. Among the amino acids, which are the protein building blocks, a group of them are called indispensable aminoacids (IAAs) or essential amino-acids (EAAs): the human body is not capable of synthesizing them itself, so they must be provided in the diet for the body to fulfil its physiological functions. The low variety of food, which is common of the plant-based diets of some rural regions of the world, can cause a dietary protein inadequacy. On the other hand, most Western (including European) diets are of high quality in terms of proteins intake, because these diets are based on a combination of a variety of proteins of plant origin, and on animal-based foods, both of which are able to provide a good intake of IAAs. Protein deficiency consequences include reduced mental capabilities and diseases such as kwashiorkor, especially in countries affected by malnutrition or famine. The recommended daily intake of dietary protein for adult men and women with normal levels of physical activity is about 0.80-0.83 g per kilogram of body weight, while the recommended amount for children and pregnant women is higher, to support the body's growth and milk production, respectively. In the special case of older adults, their daily diet is recommended to be equal or higher in terms of protein intake than in the case of younger adults, but that depends on their tendency for protein deficiencies.

The growing of the world population (expected to be 9.6 billion for 2050 according to FAO) and the consequent increasing demand for protein of both plant and animal origin have to be taken into account in relation to their effects on climate change, because the current strategy of obtaining most of the proteins of animal origin from livestock is playing an important role on climate change. Animal farming contributes to global warming even more than transportation (a 40% more than all the transportation means combined, including cars, trucks, planes, trains and ships). More recently, it has been estimated that the livestock industry is responsible of the 14.5% of all human-induced greenhouse gas (GHG) emissions of planet Earth. These include the 37% of anthropogenic methane and the 65% of nitrous oxide, which multiply 23-fold and 296-fold the GWP (Global-warming Potential) of $CO_2$ respectively. The livestock activities related to beef, cattle milk production, pig meat and poultry contribute to 41, 20, 9 and 8 percent of the total GHG emissions derived from the sector respectively, while the remaining contribution is represented by manure storage, processing, and transportation of livestock-derived products. In addition, livestock is having a considerable effect on fresh water pollution and availability, biodiversity, land degradation, desertification, and deforestation, the last being the land-related change activity that generates most GHG emissions. It has been studied the environmental impact of different dietary patterns and it was found that the vegan diet had the lowest impact. In addition, it is known that a plant-based agriculture has a much lower environmental impact with regards to freshwater use, amount of land required and waste products generated, than agriculture for meat production.

Given the previously described arguments on the contribution of a diet comprising a variety of protein nutrients for the improvement of the global public health, and on the importance of a movement towards a more sustainable agriculture and livestock system, the need of finding healthy alternative strategies to meat produced from animals seems fundamental and urgent.

Recently, some alternatives to meat from livestock have emerged: some of them are based on the use of plant-based ingredients such as soy to imitate meat, while others are based on the technology of tissue engineering, where cells are combined with a scaffold and growth factors to generate a so-called clean meat products.

In U.S. Pat. No. 9,808,029-B2 (2017), Fraser et al. disclosed a plant-based food product comprising a heme-containing protein that produced compound with a beef-associated aroma when cooked, to resemble the flavour of meat. However, the current technologies based on the use of plant-based proteins to imitate the flavour of meat are not able to mimic the consistency, fibrous texture and elasticity of fibrous meat of animal origin. In fact, one of main reasons of meat's mechanical properties and texture is due to its typical anisotropic nature.

Traditional techniques such as moulding of plant-based food cannot mimic the animal native tissues, because they cannot imitate the fibres anisotropic distribution and orientation typical of meat from live animals. When moulding a plant-based material, the network microstructure of the obtained mould will differ very much to the meat typical anisotropic microstructure.

In an attempt of better resembling traditional animal meat texture, a fibrous structural pattern with a granular mixture of plant proteins (soy protein isolate and gluten) was developed and disclosed by Krintiras et al. "On the use of Couette Cell technology for large scale production of textured soy-based meat replacers", Journal of Food Engineering-2016, vol. no. 169, pp.: 205-213. Krintiras et al. demonstrated that application of simple shear flow and heat in a device comprising to coaxial cylinders, fibrous structures with anisotropic fibres and resembling meat could be obtained. The fibres are aligned along the direction of the flow of the material throughout the two cylinders. This material is viewed as a good meat replacer, but it stills fails to resemble highly textured and fibrous meat. In addition, a special device is needed.

In U.S. Pat. No. 8,703,216-B2 (2014), Forgacs et al. disclosed a method of forming tissue-engineered comestible meat products formed as a plurality multicellular bodies comprising non-human cells (specifically myocytes) cohered to one another in the form of layers, including a strategy based on bioprinting, which is the process of 3D printing with live cells embedded into biocompatible inks, called bioinks. http://worldwide.espacenet.com/publication-Details/biblio?CC=WO&NR=2013016547A2&KC=A2&FT=D However, in technologies based on tissue engineering it is necessary to culture animal cells in laboratories, to make them produce a cellular structure similar that of meat from live animals. In addition, current tissue engineering technologies are only able to produce simplified artificial tissues in comparison with the native animal tissues. Although tissue engineering technologies try to direct the cells to imitate the native tissues structure at a cellular level, these strategies require maintaining a large-scale cell culture in the laboratory, which is very expensive and complicated, and commonly require to provide the cultured cells with a large amount of proteins of animal origin, in the form of the so-called Fetal Bovine Serum (FBS), to allow their growth.

In US Patent Application US2016135493-A1 (2016), Kuo et al. disclosed an additive manufacturing printer system, comprising a plurality of capsule holders, able to manufacture food products by 3D printing through a telescopic extrusion apparatus.

Other authors also assessed the printability of protein and fibrous food materials. One example are the snack products manufactured and disclosed in Lille et al., "Applicability of protein and fibre-rich food materials in extrusion-based 3D printing", Journal of Food Engineering-2017, http://dx-.doi.org/10.1016/j.jfoodeng.201704.034. Lille et al. evaluated the printability of different edible compositions comprising different concentrations of proteins and/or sugars, such as starch, skimmed milk, semi-skimmed milk, combinations of these edible compositions, rye bran, oat and faba bean. For many of these compositions, viscoelastic properties where measured, including the storage modulus (G') and loss modulus (G") and phase angle values, finally concluding that the compositions usable for printing and further having self-supporting once printed should have a G' lower than 1900 Pa. In any other cases, obstruction of the extruders with high viscous compositions or phase-separation of the components took place. The printed structures were made with a VTT's micron scale dispensing environment based on nScrypt technology (nScrypt, Inc, Orlando, Fla.), and a CAD-controlled xyz-motion control system guiding the nozzles to deposit 3D structures in a layer-by-layer approach. Lille et al., also assessed the capability of the printed material in terms of self-supporting abilities, as well as the effects of lyophilisation and of heating in oven after the printing.

Many efforts have been made to obtain edible fibrous materials that in addition can be easily manufactured and processed. However, the rheological parameters of highly fibrous materials compositions require particular devices, such as a Couette cell, in order to obtain a texture resembling partially fibrous anisotropic food (meat). These rheological properties imply, in addition, obstruction of extruders in case of 3D printing device are used, thus being highly difficult to print a highly fibrous food and limiting 3D printing strategies to edible compositions with soft textures (snacks, chocolate patterns, pizza bases, etc.). The existing technologies producing plant-based products are not able to simultaneously mimic time the flavour, appearance, consistency, fibrous texture and elasticity of meat from live animals. Clean meat technologies based on tissue engineering have a series of drawbacks, including the cost, complexity and time-consuming characteristics of their processes Thus, there is a need of additional processes and materials that could provide all essential nutrients while reducing, in particular, animal meat production, said materials avoiding the above-mentioned drawbacks.

SUMMARY OF INVENTION

It has been surprisingly found that the combination of a particular viscoelastic composition or material, which could be microextruded while having self-supporting properties once microextruded, and the particular disposition of layers comprising microextruded elements made of the said viscoelastic composition, gave as a result an edible product with a final texture and mechanical properties resembling traditional meat or a type of food with high fibrous consistency. Therefore, a product was obtained with desired nutritional properties (due to the composition of the viscoelastic material), tridimensional (3D) shape, macroscopic and microscopic morphology, consistency, elasticity under both tensile and compressive stresses and texture to mimic specific mechanical and nutritional properties of different animal and vegetable native tissues.

Thus, as will be depicted and illustrated in examples below, many of the mechanical properties of the edible microextruded product, makes it as a useful meat replacer, meat analogue or as tissue engineered meat that can include the desired composition of nutrients provided by the said viscoelastic composition.

Thus, a first aspect of the invention relates to a process for the manufacturing of an edible microextruded product comprising two or more layers of viscoelastic microextruded elements, wherein each extruded element comprises protein, an edible pseudoplastic polymer and an appropriate edible solvent, comprising the steps of:

(i) providing a viscoelastic composition comprising in an appropriate edible solvent, protein and an edible pseudoplastic polymer, said viscoelastic composition comprising a percentage by weight of protein from 19% to 49%, and at least 45% of edible solvent, both percentages in relation with total weight of the viscoelastic composition, said edible solvent balancing up to 100% by weight of the viscoelastic composition;

(ii) microextruding the viscoelastic composition through an orifice with a width or diameter of from 10 μm to 1000 μm to obtain one or more microextruded elements; and (iii) stacking the two or more layers comprising microextruded elements in such a way that a vertical section of the edible microextruded product shows intersected microextruded elements within a layer, or microextruded elements superimposed and differentially oriented between the different layers; or alternatively the two or more layers are stacked in such a way that microextruded elements between layers are oriented in parallel.

Particular modes of carrying out this process are detailed in next sections.

The invention relates to and provides an edible microextruded product comprising two or more layers of viscoelastic microextruded elements, wherein each extruded element comprises protein, an edible pseudoplastic polymer and an appropriate edible solvent, wherein:

the percentage by weight of protein in relation with total weight of the microextruded element is from 19% to 49%, and the percentage by weight of edible solvent in relation with total weight of the microextruded element is at least 45%;

the microextruded elements have a cross section width from 10 μm to 1000 μm;

the compressive elastic modulus of the edible microextruded product is from $1.0 \times 10^3$ Pa to $5.0 \times 10^6$ Pa and the tensile Young's modulus of the edible microextruded product is from $5.0 \times 10^3$ Pa to $11.0 \times 10^6$ Pa, said compressive elastic and the tensile Young's moduli measured in a servo-hydraulic test system with a clamp displacement rate equal to 1 mm/min, at 23° C. and with a solvent amount in the edible microextruded product from 45 to 90% w/w; and the two or more layers of microextruded elements are stacked in such a way that a vertical section of the edible microextruded product shows intersected microextruded elements within a layer, or microextruded elements superimposed and differentially oriented between the different layers; or alternatively the two or more layers are stacked in such a way that microextruded elements between layers are oriented in parallel.

Thus, a second aspect of the invention is an edible microextruded product obtainable by a method as defined in above, said product comprising two or more layers of viscoelastic microextruded elements, as previously defined, and wherein the compressive elastic modulus of the edible microextruded product is from $1.0 \times 10^3$ Pa to $5.0 \times 10^6$ Pa and the tensile Young's modulus of the edible microextruded product is from $5.0 \times 10^3$ Pa to $11.0 \times 10^6$ Pa, said compressive elastic and the tensile Young's moduli measured in a servo-hydraulic test system with a clamp displacement rate equal to 1 mm/min, at 23° C. and with a solvent amount in the edible microextruded product from 45% to 90% w/w.

These compressive elastic and Young's moduli result from qualitative and quantitative features of the viscoelastic composition from which viscoelastic microextruded elements are made, in combination with the other features of the edible microextruded product, namely cross section of elements and stacking of the layers of microextruded elements This edible microextruded product is obtained through different mechanical and optionally chemical steps that do not affect its edibility and nutritional properties. In addition, microextrusion can be carried out by 3D printing, using a viscoelastic composition as injectable ink for 3D printing from which the microextruded elements are made. This is due to the rheological properties of said viscoelastic composition comprising proteins and pseudoplastic polymers in appropriate solvent, in particular in water.

Yet another aspect of the invention is the use of an edible microextruded product as defined above, as a meat replacer. This aspect can also be formulated as a meat replacer comprising or consisting of the edible microextruded product of the first aspect of the invention. A "Meat replacer" according to this invention is a product used to reduce or "replace" real meat coming from animals to obtain a mixture of both meat from animals (steak, sausages, etc.) and the meat replacer.

Further another aspect of the invention is the use of an edible microextruded product as defined above as a meat analogue. This aspect can also be formulated as a meat analogue comprising or consisting of the edible microextruded product of the first aspect of the invention. "Meat analogues" are commonly understood as a meat alternative, meat substitute, mock meat, faux meat, imitation meat, vegetarian meat, plant-based meat or vegan meat, approximates certain aesthetic qualities (such as texture, flavour, appearance) or chemical characteristics of specific types of meat. Sometimes they are also termed as "meat replacer" (see Krintiras et al. supra)

One hit of the invention is, as above exposed, the effective combination of a particular qualitative viscoelastic composition that can be microextruded to obtain self-supporting microextruded elements, and the disposition of the said microextruded elements within the two or more layers. This viscoelastic composition has appropriate viscoelastic parameters that make it able for microextrusion due to the presence of the pseudoplastic polymer. A pseudoplastic polymer is a polymeric compound with shear thinning, or which is the same with a viscosity that decreases under shear strain.

It has been surprisingly found that new mixtures of proteins and pseudoplastic polymers in a solvent (i.e. in water) having particular viscoelastic parameters are in particular good to be used in the preparation of the edible microextruded product of the first aspect. Thus, particular new viscoelastic compositions have been also developed, with high protein contents (from 19% to 49% in the composition) and comprising also an edible pseudoplastic polymer in an edible solvent. Parametrically defined, these new viscoelastic compositions have a storage modulus G' higher than the loss modulus G", said G' and G" measured at a frequency of 0.16 Hz and at a temperature of 23° C. in a pair of parallel serrated plates and with a solvent amount in the composition from 45% to 90% w/w, being the storage modulus G' higher than 1700 Pa and the loss modulus G" higher than 350 Pa, and wherein the ratio G"/G' in the viscoelastic composition is from 0.24 to 0.88. This ratio is also known as the loss tangent (tan(δ)).

Thus another aspect of the invention is an edible viscoelastic microextrudable composition comprising, in an appropriate edible solvent, protein in a percentage by weight in relation with the total weight of the viscoelastic composition from 19% to 49%, said protein selected from plant-origin protein, insect protein, algae-origin protein, bacterial origin protein, and combinations thereof; and an edible pseudoplastic polysaccharide selected from alginate, xanthan gum, glycosaminoglycans, agarose, gellan gum, pectin, carrageenan and combinations thereof, in a percentage by weight in relation with the total viscoelastic composition from 0.2% to 40%; and wherein the viscoelastic composition comprises at least 45% by weight of edible solvent, in relation with the total weight of the composition. The balance of the weight is the solvent until 100% of the viscoelastic composition.

This viscoelastic composition is microextrudable, thus with an homogeneous distribution of particle sizes of the mixture of ingredients (i.e. protein, edible solvent and pseudoplastic polymer) lower than 60% of the width or diameter of orifice through which is to be microextruded. Homogeneous distribution means that more than 90% by weight of the particles have a particle size which is lower than 60% of the width or diameter of orifice through which is to be microextruded.

Thus, if the viscoelastic composition is to be microextruded through orifices with a particular width or diameter ranging from 10 μm to 1000 μm, the viscoelastic composition has a homogeneous distribution of particle sizes from lower than 6 μm to lower than 600 μm. Thus more than 90% by weight of the particles have a particle size lower than 6 μm if width or diameter of orifice through which is to be microextruded is of 10 μm; or more than 90% by weight of the particles have a particle size lower than 600 μm if width or diameter of orifice through which is to be microextruded is of 1000 μm.

With this 60% of the width or diameter of orifice, obturation of extruders used in step (ii) of the process of the invention are avoided.

Obtention of viscoelastic compositions with high protein contents (19%-49%) and pseudoplastic polymers with an homogeneous distribution of particle sizes is not trivial, since the mixture of proteins in a high weight percentage and pseudoplastic tends to phase-separate, thus making extrusion not possible due to clog of extruders and/or decomposition of the material to be microextruded. On the other hand, the mixture has to preserve protein structure to assure once microextruded the palatability (mouthfeel) and texture of animal-based (or meat like) fibrous material.

Inventor surprisingly found that a homogenous mixture of proteins with a percentage by weight in the mixture from 19% to 49%, a pseudoplastic polymer and at least 45% of an edible solvent balancing 100% of the mixture, was obtainable by:
(a) mixing the proteins, the edible pseudoplastic polymer and the edible solvent in a container; and
(b) applying agitation to high centrifugal forces during a raising of temperature from room temperature (i.e, 20° C.) to lower than 95° C. and maintaining agitation and temperature for a period of time from 1 minute (min) to 30 minutes (min).

Despite the high agitation, protein structure was not damaged in such an extend to lose structural and organoleptic properties while the mixture was constituted by particles with sizes that were adequate to pass through a microextruder without clog of the same.

These high gravity forces are usually employed in the ceramic field, to obtain homogeneous mixtures of cements or ceramic materials. However, their use in compositions comprising proteins as fibrous material is discouraged due to the denaturation effect on said proteins.

Thus, another aspect of the invention is a new edible viscoelastic microextrudable composition comprising, an edible pseudoplastic polymer, a percentage by weight of protein from 19% to 49% w/w, and at least 45% w/w of an edible solvent, said solvent balancing up to 100% w/w of the viscoelastic composition, both percentages in relation with total weight of the viscoelastic composition, said viscoelastic composition having an homogeneous distribution of particle sizes from lower than 6 μm to lower than 600 μm, and being obtainable by:
(a) mixing the proteins, the edible pseudoplastic polymer and the edible solvent in a container; and
(b) applying one or more agitation cycles to a centrifugal force or relative centrifugal force (rcf) from 10 g to 4000 g, optionally in more than one direction, while raising the temperature from 20° C. to a temperature lower than 95° C., and maintaining agitation and temperature for a period of time from 1 minute to 30 minutes.

Relative centrifugal forces around 10 g correspond to 300 revolutions per minute (rpm) in a rotor with a radius of 10 cm. 4000 g correspond to about 6000 rpm, namely 5976 rpm. Relative centrifugal forces around 60 g correspond to 730 revolutions per minute (rpm) in a rotor with a radius of 10 cm.

BRIEF DESCRIPTION OF DRAWINGS

FIG. 1 in B depicts a non-microextrudable formulation, composed of 55 w/w % of rice protein and 45 w/w % of water.

FIG. 2 B depicts a formulation generating non self-supporting microextruded filaments, composed of 5 w/w % sodium alginate and 95 w/w % of water.

FIG. 7 B depicts a representative measurement of the engineering stress-strain curve, when a product was subjected to tensile stresses. The engineering stress-strain curve in FIG. 7 B depicts a representative tensile test conducted on the product generated using the composition with 25 w/w % of rice protein, 25 w/w % of sodium alginate and 50 w/w % of water. Stress is indicated in MPa, and strain in mm/mm.

FIG. 8 B depicts a representative measurement of the engineering stress-strain curve, when a product was subjected to compressive stresses. The engineering stress-strain curve in FIG. 8 B depicts a representative compression test conducted on the product generated using the composition with 25 w/w % of rice protein, 25 w/w % of sodium alginate and 50 w/w % of water. Stress is indicated in MPa, and strain in mm/mm.

FIG. 10 (A and B) depicts representative scanning electron microscopy images of the micro-structure of a selected product at 200× of magnification, from top-view and transversal view angles, respectively. The product depicted in these images was composed of 25 w/w % of rice protein, 25% of sodium alginate, and 50 w/w % of water.

FIG. 11 (A and B) depicts representative scanning electron microscopy images of the micro-structure of a selected product, at 200× and 15000× of magnification, respectively. FIG. 11 B represents a magnification of the same image depicted in FIG. 11 A; at higher magnification, it was possible to observe an alignment in the direction of the nanofibres, which are contained on the inside of a single microextruded filament.

FIG. 14, A and B depict representative images obtained during the cooking process in a pan of the products described in this example, compared with a piece of chicken breast meat.

FIG. 15 depicts an example of a microextrudable viscoelastic formulation composed of 75 w/w % of water, 20 w/w % Pea Protein (PP) and 5 w/w % carrageenan (CG), generating self-supporting microextruded filaments.

DETAILED DESCRIPTION OF THE INVENTION

Figure 1A:
FIG. 1 in A depicts a microextrudable formulation (viscoelastic composition), composed of 25 w/w % of rice protein, 5 w/w % of sodium alginate and 70 w/w % of water.

All terms as used herein in this application, unless otherwise stated, shall be understood in their ordinary meaning as known in the art. Other more specific definitions for certain terms as used in the present application are as set forth below and are intended to apply uniformly through-out the specification and claims unless an otherwise expressly set out definition provides a broader definition.

According to the description a "viscoelastic composition" or "viscoelastic material" (used interchangeably as synonymous) is a composition that has viscoelastic behaviour. Viscoelasticity is the property of materials that exhibit both viscous and elastic characteristics when undergoing deformation. Viscous materials, like water, resist shear flow and strain linearly with time when a stress is applied. Elastic materials strain when stretched and immediately return to their original state once the stress is removed. Viscoelastic materials have elements of both of these properties and, as such, exhibit time-dependent strain. Whereas elasticity is usually the result of bond stretching along crystallographic planes in an ordered solid, viscosity is the result of the diffusion of atoms or molecules inside an amorphous material. Viscoelasticity is studied using shear rheometry, applying a small oscillatory stress and measuring the resulting strain. The storage and loss modulus in viscoelastic materials measure the stored energy, representing the elastic portion, and the energy dissipated as heat, representing the viscous portion. Similarly, it is also defined and herewith used as synonymous of "shear storage (G')" and "shear loss (G")" moduli. In rheology, shear thinning is the non-Newtonian behaviour of fluids whose viscosity decreases under shear strain or time. It is sometimes considered synonymous for pseudoplastic behaviour (as in present description), and it is usually defined as excluding time-dependent effects, such as thixotropy. Shear-thinning behaviour is generally not seen in pure liquids with low molecular mass, or ideal solutions of small molecules like sucrose or sodium chloride, but is often seen in polymer solutions and molten polymers, and complex fluids and suspensions like ketchup, whipped cream, blood, paint, and nail polish.

Viscoelastic properties are determined through rheological measurements under shear stress. This analysis can serve to evaluate the optimal viscoelastic properties of the compositions that can be properly microextruded in the form of multilayered products. A particular device used for this aim is a rheometer, such as the Haake Mars III rheometer (Thermo Fisher Scientific, USA), usually operating at 23° C. The measuring system consists of a pair of parallel serrated plates, to avoid wall slip and provide an enhanced gripping of the compositions that are measured. For the measuring of viscoelastic properties of the compositions disclosed in this description comprising proteins and pseudoplastic polymers a compressive stress with a normal force of 5 N was applied (see below in examples). Oscillatory tests were conducted to measure the viscoelastic moduli (storage modulus G' and loss modulus G"), the modulus of the complex viscosity ($|\eta^*|$) and the loss tangent ($\tan(\delta)$), measured as $\tan(\delta)=G"/G'$ (herewith also named ratio G"/G'), which determines the relation between the viscoelastic moduli. To this aim, two different kinds of oscillatory tests are conducted: amplitude sweep and frequency sweep tests. In the amplitude sweep tests, the frequency is fixed at f=1 Hz, and the amplitude of the applied stress ($\sigma$) is increased from 0.005 Pa to 2 Pa, to delimitate the viscoelastic linear region (VLR), which is the region for which the viscoelastic moduli are independent of the stress amplitude, and constant values of the moduli are usually observed. Then frequency sweep tests are conducted, in which the applied stress is fixed at a value within the VLR, and the frequency is varied. Frequency sweep tests allow the evaluation of the behaviour of the viscoelastic moduli under changing frequencies. The loss tangent $\tan(\delta)$ is measured at 0.15 Hz.

The compressive elastic modulus of a material characterises the relationship between the compressive stress applied to a material and the correspondent compression strain, essentially defining how easy it is to squeeze or compress the material between two clamps. In the case of polymeric-based materials containing high amount of liquids within their networks, such as hydrogels, the analysis of their viscoelastic mechanical behaviour under compressive stresses is commonly analysed by submitting the materials to unconfined compression tests. When unconfined compression tests are performed on such liquid-swollen materials, the compressive elastic modulus is typically calculated, by compressing the materials at fixed slow displacement rates, as the slope of the engineering stress-strain curves corresponding to a defined strain value that is specified in the study (e.g. at 15% of strain).

The tensile Young's modulus (or simply Young's modulus) is a mechanical parameter of materials that measures the stiffness of a solid material under tension. This parameter gives information about the behaviour of the edible product when submitted to uniaxial tensile stress. It defines the relationship between stress (force per unit area) and strain (proportional deformation) in a material in the linear elasticity regime of a uniaxial deformation. Young's modulus, E, can be calculated by dividing the engineering tensile stress, σ, by the engineering extensional strain, ε, in the elastic (initial, linear) portion of the engineering stress-strain curve.

Determination of mechanical parameters of the edible microextruded product in this description was performed using known standard methods. To evaluate the mechanical resistance of the edible microextruded products, the mechanical behaviour under tensile and compression stresses was evaluated using a servo-hydraulic test system with a 500 N load sensor (MTS Bionix 358, USA) at 23° C. and with a solvent contents (water or hydration grade) in the edible product ranging from 45% to 90 w/w %. The values of the tensile Young's modulus ($E_Y$), engineering stress at Break ($\sigma_B$) and engineering strain at break ($\varepsilon_B$) were calculated under uniaxial tensile stress, and the value of the elastic compressive modulus ($E_C$) was calculated under unconfined uniaxial compressive stress. The clamps displacement rate was kept constant during the experiment, being equal to 1 mm/min for both the tension and compression tests. The Young's modulus was calculated as the slope of the initial, linear portion of the engineering stress-strain curve, while the engineering stress at break ($\sigma_B$) and the engineering strain at break ($\varepsilon_B$) were determined at the point of fracture, which was followed by a fast decrease of the stress value. For the compression tests, the elastic compressive modulus was determined from the slope of the stress-strain curve at 15% strain. Equivalent modes of measurement include the slope of a stress-strain curve at strain from 10% to 60%.

"Anisotropy" is the property of being directionally dependent, which implies different properties in different directions, as opposed to "isotropy". It can be defined as a difference, when measured along different axes, in a material's physical or mechanical properties (absorbance, refractive index, conductivity, tensile strength, etc.). An example of anisotropy is seen in wood or in meat, which is easier to break along its grain than across it. With the several particular dispositions of the microextruded elements forming the layers of the edible product, the product has anisotropy in the sense that it will be easier to split along one direction than in another one as also occurs with meat of traditional animal production. This is the case when the two or more layers of the edible product are stacked in such a way that microextruded elements between layers are oriented in parallel.

The expressions "edible" and "edible salt thereof" refers to materials, compositions or vehicles (solvents) that can be ingested (food grade) and that are compatible with other ingredients in the edible product. It must be for humans and animals use without excessive toxicity, irritation, allergic response, immunogenicity or other problems or complications commensurate with a reasonable benefit/risk ratio.

When in the present description it is said that the "two or more layers are of microextruded elements" it is to be understood that the said layers comprises microextruded elements made of the viscoelastic composition. The expression includes that the layers are constituted or conformed only of these microextruded elements or that besides said microextruded elements other edible materials are also included in the layer. In the same way, the expression "microextruded elements made of viscoelastic composition" relates to microextruded elements made of said viscoelastic composition.

For "vertical section" is to be understood according to this description, as the section plane cutting the stacking layers perpendicularly, allowing visualizing the different stacked layers.

As used herein, the term "particle size" relating to the viscoelastic composition, refers to a characteristic physical dimension. For example, in the case of a particle that is substantially spherical, the size of the particle corresponds to the diameter of the particle. In case of non-perfectly spherical, which is commonly the case when fibrous proteins are used, size corresponds commonly to short axis of an ellipsoid, since during extrusion ellipsoid particles orient their long axis parallel to extrusion direction. When referring to a set of particles as being of a particular size, it is contemplated that the set can have a distribution of sizes around the specified size. Thus, as used herein, a size of particles or particle sizes can refer to a mode of a distribution of sizes, such as a peak size of the distribution of sizes. In addition, when not perfectly spherical, which is commonly the case when fibrous proteins are used, the diameter is the equivalent diameter of the spherical or body including the object. This diameter is generally referred as the "hydrodynamic diameter", which measurements can be performed using a Wyatt Möbius coupled with an Atlas cell pressurization system or Malvernor other Laser diffraction particle size analyser systems. Transmission Electron Microscopy (TEM) or Scanning Electron Microscopy (SEM) images do also give information regarding diameters. On the alternative, particle size can be measured using a sieve retention method, in which particle size is measured by a sieving method. According to this sieving method, the material, which particle size and/or distribution of particle sizes is to be measured, is introduced in a sieve comprising circular sieving units. Each sieving unit has a particular pore diameter and they are organized from the largest to the smallest one, in such a way each of the sieving units hermetically close to the other in order to avoid loss of material. Sieving units are submitted to vibration for a predetermined time (i.e. 5 minutes) in such a way that the material achieves all the sieving units, and the material is at the end of the test distributed in different fractions along all the sieving units. The sieving units are finally weighed to calculate the weight percentage of each of the fractions.

Homogeneous distribution of particle sizes relates to a set of different particle sizes but with a high percentage (at least 90%) of a particular size or particular group of sizes (i.e. lower than a fixed value).

As used herein, the term "% w/w", "wt %", or "percentage by weight" of a component refers to the amount of the single component relative to the total weight of the composition or, if specifically mentioned, of other component.

As above indicated, the invention encompasses as a first aspect a process for the manufacturing of an edible microextruded product comprising two or more layers of viscoelastic microextruded elements, wherein each extruded element comprises protein, an edible pseudoplastic polymer and an appropriate edible solvent, comprising the steps of:

(i) providing a viscoelastic composition comprising in an appropriate edible solvent, protein and an edible pseudoplastic polymer, said viscoelastic composition comprising a percentage by weight of protein from 19% to 49%, and at least 45% of edible solvent, both percentages in relation with total weight of the viscoelastic composition, said edible solvent balancing up to 100% by weight of the viscoelastic composition;

(ii) microextruding the viscoelastic composition through an orifice with a width or diameter of from 10 µm to 1000 µm to obtain one or more microextruded elements; and (iii) stacking the two or more layers comprising microextruded elements in such a way that a vertical section of the edible microextruded product shows intersected microextruded elements within a layer, or microextruded elements superimposed and differentially oriented between the different layers; or alternatively the two or more layers are stacked in such a way that microextruded elements between layers are oriented in parallel.

Thus, it is provided an edible microextruded product comprising two or more layers of viscoelastic microextruded elements, wherein each extruded element comprises protein, an edible pseudoplastic polymer and an appropriate edible solvent, wherein:

the percentage by weight of protein in relation with total weight of the microextruded element is from 19% to 49%, and the percentage by weight of edible solvent in relation with total weight of the microextruded element is at least 45%, said edible solvent balancing up to 100% by weight of the viscoelastic composition;

the microextruded elements have a cross section width from 10 µm to 1000 µm;

the compressive elastic modulus of the edible microextruded product is from $1.0 \times 10^3$ Pa to $5.0 \times 10^6$ Pa and the Young's modulus of the edible microextruded product is from $5.0 \times 10^3$ Pa to $11.0 \times 10^6$ Pa, said compressive elastic and the Young's moduli measured in a servo-hydraulic test system with a clamp displacement rate equal to 1 mm/min, at 23° C. and with a solvent amount in the edible microextruded product from 45% to 90% w/w; and the two or more layers of microextruded elements are stacked in such a way that a vertical section of the edible microextruded product shows intersected microextruded elements within a layer, or microextruded elements superimposed and differentially oriented between the different layers; or alternatively the two or more layers are stacked in such a way that microextruded elements between layers are oriented in parallel.

Then, another aspect as above indicated is the edible microextruded product obtainable by a method as defined above, said product comprising two or more layers of viscoelastic microextruded elements, as previously defined, and due to the method wherein the compressive elastic modulus of the edible microextruded product is from $1.0 \times 10^3$ Pa to $5.0 \times 10^6$ Pa and the tensile Young's modulus of the edible microextruded product is from $5.0 \times 10^3$ Pa to $11.0 \times 10^6$ Pa, said compressive elastic and the tensile Young's moduli measured in a servo-hydraulic test system with a clamp displacement rate equal to 1 mm/min, at 23° C. and with a solvent amount in the edible microextruded product from 45% to 90% w/w.

In other words, it also forms part of the invention, an edible microextruded product, obtainable by:

(i) providing a viscoelastic composition comprising, in an appropriate edible solvent, protein and an edible pseudoplastic polymer, said viscoelastic composition comprising a percentage by weight of protein from 19% to 49% in relation with total weight of the viscoelastic composition, and at least 45% of edible solvent, said edible solvent balancing up to 100% by weight of the viscoelastic composition;

(ii) microextruding the viscoelastic composition through an orifice with a width or diameter of from 10 µm to 1000 µm to obtain one or more microextruded elements; and (iii) stacking the two or more layers comprising microextruded elements in such a way that a vertical section of the edible microextruded product shows intersected microextruded elements within a layer, or microextruded elements superimposed and differentially oriented between the different layers; or alternatively the two or more layers are stacked in such a way that microextruded elements between layers are oriented in parallel.

This edible microextruded product has a compressive elastic modulus and a tensile Young's modulus within the values indicated above.

For "intersected microextruded elements" is to be understood that at least two of the elements are crossed in the same plane. On the contrary, "superimposed and differentially oriented microextruded elements" relate to elements that are in contact and intersect but at different planes, one element disposed on the other one.

When it is said that the compressive elastic modulus and the Young's modulus of the edible microextruded product is measured with a solvent amount in the edible microextruded product from 45% to 90% w/w, it is meant that the measure of this two mechanical properties of the edible product is performed when the product is in hydrated form, in case the solvent consists in water, which solvent can comprise additional components such as mineral salts, vitamins and other edible additives. Therefore, the values of the two mechanical properties are the ones before any other process of drying, cooking, freezing or lyophilisation is performed.

Next sections relate to particular embodiments of the first and second aspects.

In a particular embodiment, the edible microextruded product according to the second aspect is made of a viscoelastic composition comprising the protein, the edible pseudoplastic polymer, and the appropriate edible solvent, wherein the percentage by weight of protein, edible pseudoplastic polymer and of the edible solvent with respect to the viscoelastic composition is the same percentage than in the microextruded element.

In another particular embodiment, the edible microextruded product of the second aspect comprises from 2 to 500 layers, more in particular from 2 to 100 layers of microextruded elements. In a more particular embodiment, it comprises from 10 to 50 layers of microextruded elements. Even more in particular it comprises from 10 to 20 layers of microextruded elements.

The layers of the edible microextruded product, which comprise the microextruded elements are, indeed, configured by the particular disposition of these microextruded elements in a plane. Thus, the layers are, in particular formed of the said microextruded elements, which elements have a cross section width from 10 µm to 1000 µm. As will be indicated below, depending of the shape of the orifice for microextrusion, the elements will have a rectangular or squared cross-section or a circular cross-section. In this later case, the width from 10 µm to 1000 µm of the layers will be that defined by the diameter of the elements with circular cross section. Alternative to cross-sections, besides the rectangular, squared or circular ones, include elliptic cross section, star-shaped cross section, rhomboid cross section and other polyhedron-shape cross sections. Indeed, according to this description the expression "cross section width", when it is different from a rectangular or squared cross-section or a circular cross section, in which the width is the height of the rectangle/square or the directly the diameter of the circle, said width relates to the diameter of the circumference in which the cross section of the microextruded element is circumscribed when the cross section has a polyhedron-shape. For example, when the cross section is star-shaped, the width will be defined by the diameter of the circumference circumscribing said star. On the other hand, in case of an elliptic cross section of the microextruded element, the width will be any of the lengths of the minor or major axis depending on how the microextruded elements are disposed to configure (or form) the layer of microextruded elements.

In another particular embodiment, the width of the microextruded elements is from 100 µm to 900 µm, more in particular is from 200 µm to 800 µm, and even more in particular from 400 µm to 600 µm. In another more particular embodiment the width of the microextruded elements is selected from 400, 450, 500, 550, and 600 µm. This width corresponds to the diameter (or cross-section) of a microextruded element being a microextruded filament.

In a particular embodiment of the edible microextruded product according to the invention, the microextruded elements are selected from microextruded sheets, microextruded filaments, both sheets and filaments disposed in parallel and forming a layer, and combinations thereof. With this combination thereof is to be understood that within a layer the microextruded elements forming it can be equal or different, thus including the option of a combination of microextruded sheets and microextruded filaments. These combinations aim to texturize the edible microextruded product resembling a fibrous meat texture, thus an anisotropic fibre distribution.

In another particular embodiment, the microextruded elements are stacked in such a way that microextruded elements between layers are oriented in parallel, resembling the orientation of many skeletal muscle fibres of animals. In fact, the muscle fibres of skeletal (or also called striated) muscles of a variety of animals are cells that exhibit an elongated shape, and bundles of such elements are often arranged in a preferred and parallel direction to form a structure called fascicle, which is surrounded by a passive structure called perimysium. Such fascicles, which in turn are arranged in a group to form the muscular fascia, can be preferably oriented in the same direction as the long axis of the muscle, forming the so-called parallel muscles.

In another particular embodiment, the microextruded product comprises elements in a layer which result from extrusion through extruders or nozzles that are composed of multiple micro extruders or micronozzles, in such a way the extruded elements are composed of multiple polygons with a width from 10 µm to 1000 µm, defining a cross-section of the extruded element showing multiple intersected polygons. In this embodiment, the extruded element in a layer can be composed of multiple microelements with a width from 10 µm to 1000 µm.

In other words, if the extruder or nozzle is composed of multiple micro extruders or micronozzles, microextruded elements are within the indicated sized (width of 10 µm to 1000 µm). For example, the extruded element is manufactured from multiple micro extruders with rectangular shape, such micro extruders differentially oriented, and finally defining a final cross-sectional area of a helix.

In another particular embodiment of the process or of the edible microextruded product according to the first and second aspects, respectively, the percentage by weight of protein in relation with total weight of the microextruded element, or which is the same in the viscoelastic composition, is from 25% to 49%, and the percentage by weight of edible solvent is at least 45%. In another particular embodiment the percentage by weight of protein is from 29% to 49%, and the percentage by weight of edible solvent is at least 45%. The percentage by weight of protein and of edible solvent in the viscoelastic composition is defined as the amount of protein or of solvent in the viscoelastic composition to be used for microextrusion.

Another particular embodiment of the process of the first aspect or of the edible microextruded product according to the second aspect of the invention, the protein is selected from animal origin protein; plant origin protein; algae origin protein; yeast origin protein; bacterial origin protein; and combinations thereof. Indeed, when it is said that the viscoelastic composition comprises a protein, is to be understood as encompassing one or more protein types from the same origin or from different origins. For bacterial origin protein and yeast origin protein it is to be encompassed the proteins that can be produced in these organisms and cells by biotechnological processes, as well as the inherent proteins of these organisms and cells.

Another particular embodiment of the process of the first aspect or of the edible microextruded product according to the second aspect of the invention, the protein is selected from non-human animal origin protein; plant origin protein; algae origin protein; yeast origin protein; bacterial origin protein; and combinations thereof Particular non-human animal origin protein is selected from non-human mammal, such as cattle, pig, sheep, goat, and horse; poultry, such as chicken and turkey; insect protein; fish protein; and combinations thereof. Non-human animal origin protein relates not only to proteins directly derived from muscle tissue but also from compounds obtainable from these animals, such as dairy products derived from milk. Of particular interest are proteins containing heme groups (or heme-containing proteins), generally of cattle origin. Particular plant origin protein is selected from fruit protein, cereal protein such as maize, rice, wheat, soy, barley, oat, sorghum, rye, triticale, folio, and a combination thereof. Also of particular interest are heme-containing proteins of plant, yeast, algae, or bacteria origin.

In another particular embodiment of the process of the first aspect, or of the edible microextruded product of the second aspect, the protein is non-human animal protein. In even a more particular embodiment is insect protein.

In a particular embodiment, of the process or edible microextruded product according to the invention, the protein is selected from, plant origin protein, algae origin protein, yeast origin protein, bacterial origin protein, and combinations thereof. With this particular embodiment, vegan products (i.e. not containing animal protein) are obtained.

In another particular embodiment of the process or edible microextruded product according to the first aspect and second aspects, the percentage by weight of edible pseudoplastic in relation with total weight of the microextruded element, or which is the same in the viscoelastic composition conforming said microextruded element, is from 0.2% to 40%, and the percentage by weight of edible solvent is at least 45%.

In a more particular embodiment, the edible pseudoplastic polymer is selected from:
 a polysaccharide, more in particular from the group consisting of starch including cornstarch starch, cowpea starch, rice starch, kudzu starch and others starches, locust bean gum, tara gum, guar gum, xanthan gum, carrageenan and its derivatives, such as kappa carrageenan, furcelarato and iota carrageenan, karaya gum, gellan gum, deacetylated gellan gum, high acryl(elastic) gellan gum, rigid (low acryl) gellan gum, gum arabic, alginic acid or an edible salt of alginic acid such as sodium alginates and derivatives such as alginate di-aldehydes and oxidised alginates, curdlan, konjac or konjac glucomannan, fenugreek gum, cellulose and its derivatives such as hydroxypropyl cellulose, hydroxypropyl methyl cellulose, carboxymethyl cellulose, or methyl cellulose, nanofibrillated cellulose or cellulose nanofibers, bacterial cellulose, chitin, chitosan, pectin, high methoxyl pectin, low methoxyl pectin, glycosaminoglycans such as hyaluronan, agar, agarose, dextran, pullulan, curdlan, and combinations thereof;

a pseudoplastic protein, more in particular from the group consisting of milk protein concentrates, butter milk, beta-lactoglobulin, egg white powder, whey protein, collagen, gelatin, gelatin methacrylated, glycoproteins, proteins contained in the synovial fluid, such as albumin and globulins, proteins of the bovine serum, and combinations thereof; and combinations of a polysaccharide and a pseudoplastic protein.

In a more particular embodiment, the pseudoplastic polymer is a polysaccharide selected from the group consisting of cornstarch, kudzu starch, locust bean gum, alginic acid or an edible salt of alginic acid such as sodium alginates, tara gum, kappa carrageenan, furcelarato, iota carrageenan, curdlan, konjac, cellulose and its derivatives such as hydroxypropyl cellulose, hydroxypropyl methylcellulose, carboxymethylcellulose, or methylcellulose, pectin, bacterial cellulose, karaya gum, guar gum, gellan gum, high acryl (elastic) gellan gum, rigid (low acryl) gellan gum, gum Arabic, chitin, chitosan, and xanthan gum, agar, agarose, and combinations thereof.

In another particular embodiment, optionally in combination with any embodiments above or below, the pseudoplastic polymer is a pseudoplastic protein, more in particular from the group consisting of rice protein, hemp protein, collagen, gelatin, elastin, fibronectin, osteopontin, carob protein, pea protein, wheat protein, *spirulina* protein, oat protein, soy protein, lentil protein, whey protein, peanut protein, mung bean, and combinations thereof.

Indeed, the pseudoplastic polymer could be accompanied of other compounds with pseudoplastic behaviour. These compounds with pseudoplastic behaviour can be used as the only pseudoplastic compound in the microextruded element (or viscoelastic composition provided in the process). The pseudoplastic compounds not being polymeric pseudoplastic compounds are selected from pseudoplastic lipids, in particular lechitin, butter, omega-3 fatty acids, sucrose esters, food grade animal oils and plant oils including palm, coconut, canola, jojoba, corn and sunflower oils; pseudoplastic fluids, in particular synovial fluid, bovine serum, suspensions of particles, microparticles and nanoparticles, and combinations thereof. Other pseudoplastic compounds or compositions are selected from sucrose esters, cheese, jam, ketchup, mayonnaise, soup, taffy, and yogurt.

In yet a more particular embodiment of the first and second aspects, the pseudoplastic polymer is a polysaccharide selected from alginic acid or an edible salt of alginic acid, xanthan gum, glycosaminoglycans, agarose, gellan gum, pectin, carrageenan and combinations thereof. All polysaccharides are of edible grade. In yet a more particular embodiment of the first and second aspects, the pseudoplastic polymer is a polysaccharide selected from alginic acid or an edible salt of alginic acid, xanthan gum, glycosaminoglycans, agarose, gellan gum, pectin and combinations thereof. All polysaccharides are of edible grade.

Even in a more particular embodiment, the pseudoplastic polymer is alginic acid or an edible salt of alginic acid and comprises alginic polysaccharide chains of different length. Thus, the pseudoplastic polymer is a mixture of alginic acid (or salts) chains with different molecular weight.

With this particular sodium alginate being a mixture of polysaccharide chains of different length and thus of different molecular weight, the viscosity of either the viscoelastic composition or of the microextruded element is particularly low at high shear rates, while said viscosity is increased at low shear rates. High shear rates are present during the microextrusion process. Low or null shear rates are present once the microextruded element is deposited on a support, and due to the composition of the viscoelastic composition it is self-supported.

For "self-supporting" is to be understood that once microextruded in any desired shape (sheet or filaments of circular cross section), the microextruded element does not spread or loss its shape. Self-supporting capability is the result of the viscoelastic composition that can be microextruded due to its behaviour as liquid, and that once deposited on a support it behaves as a solid.

In a more particular embodiment, the alginic acid or edible salt of alginic acid has a viscosity from 4 Pa·s to 5000 Pa·s. More in particular the alginic acid or edible salt of alginic acid has a viscosity from 100 Pa·s to 1200 Pa·s, even more in particular the viscosity is from 200 Pa·s to 800 Pa·s. In another particular embodiment, the alginic acid or edible salt of alginic acid has a viscosity selected from the group consisting of 300 Pas. S, 350 Pa. s, 400 Pa·s, 450 Pa·s, 500 Pa·s, 550 Pa·s, 600 Pa·s, 650 Pa·s, 700 Pa·s, 750 Pa·s, and 800 Pa·s. This viscosity is defined as the dynamic viscosity measured in a composition at 1% of alginic acid in water at 25° C. in a dynamic viscometer.

Particular edible salts of alginic acid include an alkali or alkaline-earth salt of alginic acid and combinations thereof. More in particular, the sodium salt of alginic acid (sodium alginate)

In another particular embodiment of the first and second aspects of the invention, the edible solvent is selected from drinking water, fruit juices, meat juices, and combinations thereof. Indeed, it can be any edible liquid capable of being mixed with the proteins and the pseudoplastic polymer to obtain a homogenized paste. More in particular is drinking water, which optionally comprises additional edible compounds selected from the list consisting of emollients, flavour compounds, aromatizing compounds, lipids, colourants, metal chelants, oligoelements, vitamins, mineral salts, and combinations thereof.

In another particular embodiment, optionally in combination with any embodiment above or below, the said viscoelastic composition has a storage modulus G' higher than the loss modulus G" when measured at 0.16 Hz and at a temperature of 23° C. in a rheometer consisting of a pair of parallel serrated plates and with a solvent amount in the composition from 45% to 90% w/w, being the storage modulus G' higher than 1700 Pa and the loss modulus G" higher than 350 Pa, and the ratio G"/G' in the viscoelastic composition being from 0.24 to 0.88. In a more particular embodiment, the storage modulus G' is higher than 2000 Pa and the loss modulus G" is higher than 1000 Pa.

In a more particular embodiment of the edible microextruded product according to the first aspect, the storage modulus G' of the viscoelastic composition has values from 2000 Pa to 140000 Pa, and the loss modulus G" of the viscoelastic composition has values from 1000 Pa to 40000 Pa; and wherein and the ratio G"/G' in the viscoelastic composition being from 0.24 to 0.88.

Edible microextruded products of the invention are in particular conceived as customizable edible materials which, besides the protein contents and the pseudoplastic polymer they include additional edible compounds of interest. Thus, in another particular embodiment, the edible microextruded product is made from a viscoelastic composition conforming microextruded elements that further comprises edible additives selected from the list consisting of emollients, flavour compounds, aromatizing compounds, lipids, colourants, metal chelants, oligoelements, vitamins, mineral salts, cells and extracts of said cells, and combinations of all these compounds and/or cells and/or cell extracts.

Thus, the process comprises providing in step (i) a viscoelastic composition that further comprises edible additives selected from the list consisting of emollients, flavour compounds, aromatizing compounds, lipids, colourants, metal chelants, oligoelements, vitamins, mineral salts, cells and extracts of said cells, and combinations of all these compounds and/or cells and/or cell extracts.

In a more particular embodiment, cells are selected from animal cells, plant cells, algae cells, yeast cells, bacterial cells, and extracts of said cells, and combinations of all these cells and/or cell extracts. In another particular embodiment, cells are selected from non-human animal cells, plant cells, algae cells, yeast cells, bacterial cells, and extracts of said cells, and combinations of all these cells and/or cell extracts. In yet another particular embodiment, cells are selected from plant cells, algae cells, yeast cells, bacterial cells, and extracts of said cells, and combinations of all these cells and/or cell extracts.

"Cell extracts" are mixtures of cell compounds obtained by lysing the cells of interest and centrifuging out the cell walls, DNA genome, and other debris. The remains are the necessary cell machinery including ribosomes, aminoacyl-tRNA synthetases, translation initiation and elongation factors, nucleases, etc. Common cell extracts in use today are made from $E.\ coli$ (ECE), rabbit reticulocytes (RRL), wheat germ (WGE), and insect cells (ICE). All of these extracts are commercially available. Yeast extract is the common name for yeast products made by extracting the cell contents (and removing the cell walls); they are used as food additives or flavourings, or as nutrients for bacterial culture media. Alternatively, ingredients carrying a concentrated and encapsulated form of omega-3 fatty acids (such as Cubiq Smart Omega-3), or ingredients composed of proteins or low-fat proteins from animal cells, plant cells, algae cells, yeast cells, bacterial cells, extracts of said cells, and combinations of said cells and/or extracts of said cells, including cell-cultured and cell-based meat substitutes and replacements components (such as Cubiq Smart Fat).

Addition of the cells or cell extracts to the viscoelastic composition to be further extruded allow maintaining extrudability properties of the composition, in order to further obtain microextruded elements made of said composition.

When in this description animal protein or animal cells are disclosed, they also include isolated human cells or isolated human proteins. Sources of these human cells and/or proteins are in particular from established cell cultures and/or obtained from recombinant technology. The use of human protein and/or cells allow for example using human recombinant haemoglobins or erythropoietin, which are better assimilated by humans. Particular embodiments of the process or edible microextrudable product of the invention comprising proteins are conceived as customized edible products that can contain cells, cells extracts and proteins of interest even with a therapeutic effect.

Among aromatizing compounds, meat-associated aromas as preferred, such as beef- chicken- or other meat-analogue, associated aromas, or marking flavours. Many of these aromas are volatile compounds that, in particular, appear when the edible product is cooked. Examples of these volatile compounds include 2-methyl-furan, bis(2-methyl-3-furyl)disulfide, 2-pentyl-furan, 3,3'-dithiobis-2-methyl-furan, 2,5-dimethyl-pyrazine, 2-methyl-3-furanthiol, dihydro-3-(2H)-thiophenone, 5-methyl-2-thiophenecarboxaldehyde, 3-methyl-2-thiophenecarboxaldehyde, 2-methyl-thiazole, dimethyl sulfide, decanal, 5-ethyldihydro-2(3H)-furanone, dihydro-5-pentyl-2(3H)-furanone, 2-octanone, 3,5-octadien-2-one, p-Cresol, hexanoic acid, sodium hydrogen diacetate, succinic acid, 2-hydroxypropanoid acid (lactic acid), hydroxyl-2,5-dimethyl-3(2H)-furanone (furonol), tartaric acid, 4-hydroxy-2,5-dimethyl-3(2H)-furanone, 3-phenyl-propenal (ciannimic aldehyde), or combinations of these.

Particular other edible additives among the above-mentioned categories include additional sugars selected from glucose, ribose, fructose, lactose, xylose, arabinose, glucose-6-phosphate, maltose, and galactose, and mixtures of two or more thereof, as well as additional isolated amino acids selected from cysteine, cystine, thiamine, methionine, and mixtures of two or more thereof. Other additives are selected from one or more of acetic acid, lactic acid, glycolic acid, citric acid, succinic acid, tartaric acid, caprylic acid, capric acid, lauric acid, myristic acid, palmitic acid, palmitoleic acid, stearic acid, oleic acid, linoleic acid, alpha linolenic acid, gamma linolenic acid, arachidic acid, arachidonic acid, behenic acid, and erucic acid.

All these additives are, in a particular embodiment, forming part of or are comprised in the viscoelastic composition from which the microextruded elements are formed. In another particular embodiment, the additives are added once the viscoelastic composition has been microextruded.

Thus, in a particular embodiment of the process according to the first aspect, it further comprises after any one of steps (ii) and (iii), a step (iv) of adding one or more additives selected from the list consisting of emollients, flavour compounds, aromatizing compounds, lipids, colourants, metal chelants, oligoelements, vitamins, mineral salts, cells and extracts of said cells, and combinations of all these compounds and/or cells and/or cell extracts, cells and cell extracts more in particular though a process of cell seeding.

These one or more additives are added by pouring, ink-jetting, dropping, laser-assisted ejecting or spraying onto the microextruded elements, or by microextruding a composition comprising said additives onto the already microextruded elements.

In yet another particular embodiment, the edible microextruded product comprises a therapeutic compound (drug) in a therapeutically effective amount, which means that it is in an amount that, when administered, is sufficient to prevent development of, or alleviate to some extent, one or more of the symptoms of the disease which is addressed. The particular dose of compound administered according to this invention will of course be determined by the particular circumstances surrounding the case, including the compound administered, the route of administration, the particular condition being treated, and the similar considerations. Examples of therapeutic compounds include, in particular, antibiotic compounds.

In a particular embodiment of the edible microextruded product comprising additives that are added once viscoelastic composition has been microextruded, said additives are, in particular cells selected from animal cells, plant cells, algae cells, yeast cells, bacterial cells, extracts of said cells, and combinations of said cells and/or extracts of said cells.

More in particular are cells selected from non-human animal cells, plant cells, algae cells, yeast cells, bacterial cells, extracts of said cells, and combinations of said cells and/or extracts of said cells.

In yet another particular embodiment, the edible microextruded product comprises eukaryotic or prokaryotic cells, being the eukaryotic cells selected from yeast cells, algae cells, insect cells, mammal cells (including human and non-human mammal cells), poultry cells or combinations thereof; and being the prokaryotic edible bacteria of probiotic use. Among mammal cells, the edible microextruded product comprises, in particular, cells selected from of cattle cells, rabbit cells, pig cells, sheep cells, goat cells, and horse cells. Other non-human animal cells are selected from poultry cells, such as cells of chicken and turkey; insect cells; and fish cells, and combinations thereof.

In another particular embodiment of the first and second aspects, the microextruded element or viscoelastic composition conforming it comprises one or more proteins in a percentage by weight of 25%, one or more pseudoplastic polymers, in particular pseudoplastic polysaccharides, in a percentage by weight of 5%, and drinking water as edible solvent, said water optionally including additional edible compounds selected from the list consisting of emollients, flavour compounds, aromatizing compounds, lipids, colourants, metal chelants, oligoelements, vitamins, mineral salts, and combinations thereof, being the percentage by weight of drinking water or of the drinking water with additives of 70% in relation to the total weight of viscoelastic composition or of a microextruded element conformed from said viscoelastic composition.

In another particular embodiment of the process and obtained product according to the invention, the microextruded element or viscoelastic composition conforming it and provided in step (i) of the process, comprises one or more proteins in a percentage by weight of 25%, one or more pseudoplastic polymers, in particular pseudoplastic polysaccharides, in a percentage by weight of 25%, and drinking water as edible solvent, said water optionally including additional edible compounds selected from the list consisting of emollients, flavour compounds, aromatizing compounds, lipids, colourants, metal chelants, oligoelements, vitamins, mineral salts, and combinations thereof, being the percentage by weight of drinking water or of the drinking water with additives of 50% in relation to the total weight of viscoelastic composition or of a microextruded element conformed from said viscoelastic composition.

In yet a more particular embodiment of the edible product of the first aspect, the viscoelastic composition or microextruded element comprises 25% of rice protein and 25% of sodium alginate and the balance of solvent (in particular water) to yield 100% by weight of the viscoelastic composition, and wherein the product has a compressive elastic modulus and a Young's modulus of the stacked layers from $7.15 \times 10^3$ Pa to $4.5 \times 10^6$ Pa and Young $0.12 \times 10^6$ Pa to $9.5 \times 10^6$ Pa, said compressive elastic and the Young's moduli measured in a servo-hydraulic test system with a clamp displacement rate equal to 1 mm/min, at 23° C. and with a final solvent amount in the edible microextruded product from 45% to 90% w/w. That is compressive elastic and Young's moduli are measured with the edible microextruded product in hydrated (or solvated) form, with an amount of water (or solvent) from 45% to 90%, said water (or solvent) in the viscoelastic composition forming the microextruded elements of the two or more layers.

In yet another particular embodiment of the edible microextruded product of the second aspect, optionally in combination with any of the embodiments above or below, the microextruded elements forming the layers comprise a cross-linker compound selected from ionic crosslinkers, in particular selected from potassium ions, calcium ions, in particular from $CaCl_2$, $CaCO_3$, $CaSO_4$, and divalent cations ionic cross-linking agents, such as calcium lactate gluconate, glucono delta-lactone, and combinations thereof; and/or crosslinking compounds for radical polymerization, in particular selected from ethylene glycol dimethacrylate, methacrylic acid or N-isopropylacrylamide, glycidylacrylate, and combinations thereof; and/or covalent crosslinking agents, in particular selected from glycerol, transglutaminase, tyrosinase, laccase, peroxidase, sulfhydryl oxidases, genipin, hydrolysable polyrotaxane, adipic acid dihydrazide, paraformaldehyde, or crosslinking carboxylic acids to primary amines with 1-ethyl-3-(3-dimethylaminopropyl)carbodiimide/N-hydroxysuccinimide and combinations thereof; and/or macromolecular crosslinkers, in particular poly(ethyleneglycol)-propiondialdehyde; and/or crosslinkers by addition reaction, in particular selected from 1,6-hexamethylenediisocyanate, divynilsulfone, 1,6-hexanedibromide and combinations thereof; and/or crosslinkers for photocrosslinking strategies, in particular selected from methacrylated polymers crosslinked by addition of photoinitiators, more in particular from 2,2-dimethoxy-2-phenylacetophenone, irgacure D2959, and lithium phenyl-2,4,6-trimethylbenzoylphosphinate, and combinations thereof.

This particular embodiment of the second aspect comprising cross-linker compounds in the microextruded elements is obtainable by a particular embodiment of the process, in which, after any of steps (ii) or (iii), a composition comprising the cross-linker is added, in particular drop-added, to the said microextruded elements.

In the particular case in which the cross-linker comprises divalent cations such as calcium ions, these are able to crosslink, in particular the alginate polymers (or other polymers comprising anionic groups, such as carboxylic groups), because they can form two bonds, as opposed to monovalent ions such as sodium, which can only form one bond. The longer the alginate is in contact with the calcium chloride solution, the more rigid the gel will become, as more crosslinks are formed. Also, depending on the concentration of calcium ions, the gels are either thermoreversible (low concentrations) or not (high concentrations). In a particular embodiment, the cross-linker is $CaCl_2$, which is added in drops to the microextruded product using a solution with a concentration of calcium chloride from 50 to 300 mM, more in particular from 100 mM to 150 mM.

In a more particular embodiment of the first and second aspects, some of the two or more layers are made of microextruded filaments of the viscoelastic composition disposed in parallel and adjacent with a percentage of microextruded filaments in the surface of the layer (fill density percentage) from 25% to 100%. In another particular embodiment the percentage of microextruded filaments in the surface of the layer is from 35% to 100%. More in particular, it is from 40% to 100%. In a more particular embodiment is from 60 to 100%. In this particular embodiment, in which the layers are made or comprise microextruded filaments of the viscoelastic composition, these filaments can be disposed at several densities of microextruded elements per unit surface. Therefore, when a percentage of microextruded filaments per unit of layer surface is under 100%, it means that the filaments are disposed in parallel, but they are not in contact, thus leading empty spaces between filaments. On the other side, if the parameter of microextruded filaments per unit of layer surface is equal to 100%, this means that the layer is constituted by the filaments disposed in parallel and each one in contact one with the other adjacent one.

In this particular embodiment, in which the microextruded elements are filaments, which mean that they are in form of threads with a longitudinal section higher than its cross section layer, they have a circular cross section with a diameter from 10 µm to 1000 µm, more in particular is from 100 µm to 900 µm, and even more in particular from 200 µm to 800 µm, or yet even more in particular from 400 µm to 600 µm. In a more particular embodiment, they have a circular cross section with a diameter selected from 400, 450, 500, 550, and 600 µm.

During microextrusion processes the polymeric compounds, as in present case proteins and the pseudoplastic polymers are, stay disposed in parallel along the extrusion direction. This gives raise to microextruded elements comprising oriented nanoelements all of which providing mechanical properties with anisotropic behaviour and a texture and consistency of meat. Thus, in a more particular embodiment, the edible microextruded product comprises microextruded filaments that comprise oriented nanoelements, in particular in a mode resembling meat nanofibres.

In another particular embodiment of the first and second aspect, the two or more layers comprise microextruded filaments and the layers are stacked in such a way that a vertical section of the edible material with the multiple fibrous layers shows the microextruded filaments of one layer differentially oriented in relation with the microextruded filaments of other stacked layer(s). In particular, the microextruded filaments forming a layer appear superimposed and differentially oriented between the different layers, or intersected within a layer. In this later case with intersected microextruded filaments they are microextruded and disposed in parallel, and transversal microextruded filaments are then disposed joining two or more of the parallel filaments.

In a particular embodiment of the process, previous to step (i) there is a step of homogenising the viscoelastic composition, which means that the viscoelastic composition is prepared by mixing in the edible solvent the protein and the said pseudoplastic polymer to obtain a homogeneous composition that not phase-separate.

More in particular, this homogeneous composition is achieved by mixing the proteins, the edible pseudoplastic polymer and the edible solvent in a container; and applying one or more agitation cycles to a centrifugal force or relative centrifugal force from 10 g to 4000 g, optionally in more than one direction, while raising gradually the temperature from 20° C. to a temperature lower than 95° C., and maintaining agitation and temperature for a period of time from 1 minute to 30 minutes.

More in particular the mixture and agitation is carried out in a dual asymmetric centrifugal system. Surprisingly, although the high speed agitation (or gravity force applied), it does not damage protein, which protein maintains the properties as fibrous material once microextruded.

In another particular embodiment of the process of the first aspect, step (ii) is carried out at a temperature from 20° C. to 90° C., more in particular from 25° C. to 50° C., even more in particular at room temperature, from 25° C. to 30° C. In another particular embodiment, optionally in combination with any process embodiment above or below, step (ii) is carried out by application of pressure to the viscoelastic composition by means of a piston. In another particular embodiment, step (ii) is performed in such a way that once microextruded the elements are cooled at a temperature from 5° C. to 15° C.

In a more particular embodiment of the process, it is carried out by 3D printing and the layers are conformed as microextruded filaments obtained from a nozzle with a diameter from 10 µm to 1000 µm. More in particular the diameter is from 10 µm to 900 µm. Even more in particular is from 200 µm to 800 µm, and even more in particular from 400 µm to 600 µm, and even more in particular selected from 400, 450, 500, 550, and 600 µm.

In another particular embodiment of the process, optionally in combination with any embodiments above or below, it further comprises after any one of steps (ii) and (iii), a step (v) of adding between microextruded elements within a layer and/or on a layer of microextruded elements, a composition comprising a fat selected from one or more triglycerides, cholesterol, one or more phospholipids, one or more fatty acids and combination thereof; and or/a composition comprising cartilaginous material and/or bone material The term "cartilaginous material" relates to particular cells, chondrocytes, and proteins composing animal cartilages. Among proteins there are collagen proteins, elastin and cartilage extracellular matrix compounds such as proteoglycans, glycoproteins and glycosaminoglycans.

The term "bone material" relates to bone tissue including osteoclasts, osteocytes, osteoblasts, bone extracellular matrix compounds such as collagen proteins and precipitated inorganic substances and mineral salts, in particular hydroxylapatite.

This particular embodiment of the process gives an edible microextruded product that comprises between two or more of the microextruded elements of each layer and/or between one or more of the layers of microextruded elements, a composition comprising a fat selected from one or more triglycerides, cholesterol, one or more phospholipids, one or more fatty acids and combination thereof; and or a composition comprising cartilaginous material.

This edible microextruded product is mimicking fat usually disposed between protein fibres in meat, and cartilaginous tissue also accompanying said protein fibres in meat. Thus, it is to be understood as a product including the edible microextruded product of the first aspect, with the particular composition and parametric features, and additionally portions of fat and/or cartilaginous tissue and/or bone material.

The invention also relates, to an edible composite product comprising a portion of the edible microextruded product according to the second aspect of the invention and a portion of a solidified composition comprising a fat selected from one or more triglycerides, cholesterol, one or more phospholipids, one or more fatty acids and combination thereof; and/or a portion of a solidified composition comprising cartilaginous material; and/or a portion comprising bone material, said portion of composition comprising fat and/or cartilaginous material and/or bone material, adjacently an in contact with the portion of the edible microextruded product.

This composite edible product can be manufactured by first manufacturing the edible microextruded product according to the second aspect and then adding one or more fat or cartilaginous or bone portions, generally in liquid form that will solidify once added, that remain adjacent and adhered to the portion of microextruded edible product previously defined due to inherent adherence of the materials.

In another embodiment the composite edible product according to the invention can be manufactured using the bioprinting fresh method (or extrusion fresh method), in which extrusion of the viscoelastic composition is performed in a liquid, hydrogels or gel media, such as a liquid, hydrogel or gel comprising or consisting of fat as previously defined and/or cartilaginous material, said liquid or gel optionally comprising edible salts. With this particular method, the microextruded elements and layers of microextruded elements and/or the edible microextruded product are embedded in said liquid, hydrogel or gel, enhancing the self-supporting property of the microextruded product.

In another particular embodiment of the composite edible product according to the invention, further comprises a portion of a composition comprising bone material. This particular embodiment is adequate as edible product for veterinary purposes. An example is an edible product for domestic animals (i.e. dogs, cats).

Composite products as defined resemble real meat products from animal origin, including fat and or cartilaginous material between protein fibres or protein areas of the meat.

Present invention encompasses also particular new viscoelastic compositions that are microextruded to obtain the edible product of the first aspect. These new edible viscoelastic microextrudable compositions comprise, in an appropriate edible solvent, protein in a percentage by weight in relation with the total weight of the viscoelastic composition from 19% to 49%, said protein selected from plant-origin protein, in particular from cereal protein, fruit protein, seed protein and legumes protein, insect protein, algae-origin protein, bacterial origin protein, and combinations thereof; and an edible pseudoplastic polysaccharide selected from alginic acid or an edible salt thereof, xanthan gum, glycosaminoglycans, agarose, gellan gum, pectin, carrageenan and combinations thereof, in a percentage by weight, in relation with the total viscoelastic composition, from 0.2% to 40%; and wherein the viscoelastic composition comprises at least 45% by weight of edible solvent, in relation with the total weight of the composition. The balance of the weight is the solvent until 100% of the viscoelastic composition.

In a particular embodiment of the viscoelastic microextrudable composition, optionally in combination with any of the embodiments above or below, the protein is in a percentage by weight in relation with the total weight of the viscoelastic composition from 20% to 40%. In a more particular embodiment, the percentage by weight of the protein is from 20% to 30%. In a more particular embodiment is of 25%. In another more particular embodiment, the protein is from cereal, more in particular, it is rice protein, and it is in a percentage by weight of 25% in relation with the total weight of the viscoelastic composition.

In another particular embodiment of the viscoelastic microextrudable composition, optionally in combination with any of the embodiments above or below, the edible pseudoplastic polymer is in a percentage by weight from 20% to 40%, more in particular from 20% to 30%, in relation with the total weight of the composition. In a more particular embodiment, the percentage by weight of edible pseudoplastic polymer is 25%. In another more particular embodiment, the edible pseudoplastic polymer comprised in the viscoelastic microextrudable composition in all previously listed percentages is a sodium alginate.

In another particular embodiment, the viscoelastic microextrudable composition comprises 25% of rice protein; 25% of sodium alginate; and edible solvent with additives up to balance 100% of the composition.

In a particular embodiment, optionally in combination with any embodiments of the viscoelastic composition above or below, the solvent is drinking water and in another particular embodiment the viscoelastic composition comprises edible additives selected from the list consisting of emollients, flavour compounds, aromatizing compounds, lipids, colourants, metal chelants, oligoelements, vitamins, mineral salts, cells or an extract thereof, and combinations of these compounds and/or cells and/or cell extracts. In another particular embodiment, the viscoelastic composition comprises edible additives selected from the list consisting of emollients, flavour compounds, aromatizing compounds, lipids, colourants, metal chelants, oligoelements, vitamins, mineral salts, animal cells or an extract thereof, plant-cells or an extract thereof, yeast cells or an extract thereof, bacterial cells or an extract thereof, and combinations thereof.

In a particular embodiment, the solvent is drinking water and in another particular embodiment the viscoelastic composition comprises edible additives selected from the list consisting of emollients, flavour compounds, aromatizing compounds, lipids, colourants, metal chelants, oligoelements, vitamins, mineral salts, and combinations thereof.

Particular edible additives among the above-mentioned categories include additional sugars selected from glucose, ribose, fructose, lactose, xylose, arabinose, glucose-6-phosphate, maltose, and galactose, and mixtures of two or more thereof, as well as additional isolated amino acids selected from cysteine, cystine, thiamine, methionine, and mixtures of two or more thereof.

In a more particular embodiment of the viscoelastic compositions of the invention, they have a storage modulus G' higher than the loss modulus G" when measured at 0.16 Hz and at a temperature of 23° C. in a rheometer consisting of a pair of parallel serrated plates and with a solvent amount in the composition from 45% to 90% w/w, being the storage modulus G' higher than 1700 Pa and the loss modulus G" higher than 350 Pa, and the ratio G"/G' in the viscoelastic composition being from 0.24 to 0.88. In a more particular embodiment, the storage modulus G' is higher than 2000 Pa and the loss modulus G" is higher than 1000 Pa. In a more particular embodiment, the storage modulus G' of the viscoelastic composition has values from 2000 Pa to 140000 Pa, and the loss modulus G" of the viscoelastic composition has values from 1000 Pa to 40000 Pa; and wherein the ratio G"/G' in the viscoelastic composition being from 0.24 to 0.88.

In another particular embodiment, the particle size of the viscoelastic composition is from 100 µm to 300 µm, more in particular is from 200 µm to 240 µm. In another more particular embodiment, particle size is of from 200 µm to lower than 240 µm. Viscoelastic compositions with an homogeneous distribution of particle sizes from 200 µm to lower than 240 µm are adequate to be microextruded through an orifice of a width or diameter of 400 µm.

Other particular embodiments of the first and second aspects of the invention relating to features of the viscoelastic composition do also apply to this other aspect of the invention.

Another aspect of the invention is a viscoelastic microextrudable composition comprising, an edible pseudoplastic polymer, a percentage by weight of protein from 19% to 49 w/w, and at least 45% w/w of an edible solvent, said solvent balancing up to 100% w/w of the viscoelastic composition, both percentages in relation with total weight of the viscoelastic composition, said viscoelastic composition having an homogeneous distribution of particle sizes from lower than 6 μm to lower than 600 μm, and being obtainable by:

(a) mixing the proteins, the edible pseudoplastic polymer and the edible solvent in a container; and (b) applying one or more agitation cycles to a centrifugal force or relative centrifugal force from 10 g to 4000 g, optionally in more than one direction, while raising the temperature from 20° C. to a temperature lower than 95° C., and maintaining agitation and temperature for a period of time from 1 minute to 30 minutes.

As previously detailed, this viscoelastic microextrudable composition with high protein weight percentages is a homogeneous composition due to applied process and it does not phase-separate, which means that protein fraction and pseudoplastic polymer are homogeneously dispensed or solved in the edible solvent.

In a particular embodiment of this composition obtainable with previous process including steps (a) and (b), centrifugal force or relative centrifugal force is from 300 g to 4000 g, more in particular from 400 g (2500 rpm in a rotor of 10 cm of radius) to 4000 g. Even in a more particular embodiment is from 400 g to 1000 g. A particular used relative centrifugal force is 900 g. which corresponds to 3500 rpm in a rotor of 10 cm of radius. Other particular values are selected from 60 g, 100 g, 150 g, 200 g, 250 g, 300 g, 350 g, 400 g, 450 g, 500 g, 550 g, 600 g, 650 g, 700 g, 750 g, 800 g, 850 g, 900 g, 950 g, 1000 g, 1500 g, 2000 g, 2500 g, 3000 g, 3500 g and 4000 g.

In another particular embodiment, optionally in combination with any embodiment above or below of the viscoelastic composition obtainable as previously disclosed, temperature is raised to a value from 60° C. to 90° C. More in particular, temperature is in a value selected from 60° C., 65° C., 70° C., 72° C., 75° C., 80° C., and 90° C.

Using particular temperatures, preservation (non-denaturation) of protein is accomplished while pasteurization of the composition takes place. These temperature ranges assures also non-decomposition of pseudoplastic polymer.

In a particular embodiment of this composition obtainable with previous process including steps (a) and (b), the percentage by weight of protein is from 25% to 49%, and the percentage by weight of edible solvent is at least 45%, balancing 100% of the composition. In yet a more particular embodiment, the percentage by weight of protein is from 29% to 49%, and the percentage by weight of edible solvent is at least 45%, balancing 100% of the composition.

In another particular embodiment, the particle size of the viscoelastic composition obtainable by the method as previously disclosed is from 100 μm to 300 μm, more in particular is from 200 μm to 240 μm. In another more particular embodiment, particle size is of from 200 μm to lower than 240 μm. Viscoelastic compositions with a homogeneous distribution of particle sizes from 200 μm to lower than 240 μm are adequate to be microextruded through an orifice of a width or diameter of 400 μm.

Other particular embodiments of the first and second aspects of the invention relating to features of the viscoelastic composition do also apply to the viscoelastic compositions obtainable as previously disclosed.

Thus, in a particular embodiment the protein is selected from animal origin protein, plant origin protein, algae origin protein, yeast origin protein, bacterial origin protein, and combinations thereof. In a more particular embodiment, the protein is animal protein, more in particular non-human animal protein. In even a more particular embodiment is insect protein.

In another particular embodiment of the viscoelastic microextrudable composition, the protein is selected from plant origin protein, algae origin protein, yeast origin protein, bacterial origin protein, and combinations thereof.

Yet in another particular embodiment, the viscoelastic microextrudable composition obtainable with the process previously disclosed, and comprising agitation at particular gravity forces from 10 g to 4000 g, has a storage modulus G' higher than the loss modulus G" when measured at 0.16 Hz and at a temperature of 23° C. in a pair of parallel serrated plates, and with a solvent amount in the edible microextrudable composition from 45% to 90% w/w, being the storage modulus G' higher than 1700 Pa and the loss modulus G" higher than 350 Pa, and wherein and the ratio G"/G' in the viscoelastic composition being from 0.24 to 0.88.

Particular additives mentioned for the viscoelastic compositions in the first and second aspects do also apply to this new viscoelastic composition obtainable by the method previously disclosed and including agitating at particular gravity forces.

The viscoelastic microextrudable compositions of the several aspects of the invention are conceived as commodities or fungible products that can be applied as "inks" to 3D-printers and/or to industrial extruders for the domestic (in home) or industrial production of customizable edible products.

Throughout the description and claims the word "comprise" and variations of the word, are not intended to exclude other technical features, additives, components, or steps.

Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

EXAMPLES

Following there are disclosed several examples of the edible microextruded products of the invention.

Example 1. Viscoelastic Compositions Comprising Rice Protein and Sodium Alginate. Edible Microextruded Product Printed with the Viscoelastic Composition Materials For the production of the edible compositions described in these examples, the materials used were water, rice protein, pea protein, and sodium alginate. Rice protein (PURYA GmbH, Germany), pea protein (Raab Vital Food GmbH, Germany), and sodium alginate (Special Ingredients Ltd, UK) were purchased in the form of soluble powders, and were certified to be edible by the respective manufacturers. Sodium alginate is a natural polysaccharide extracted from seaweed that is widely used in gastronomy, and can be used to form hydrogels with strong pseudoplastic behaviour. Particular specifications of the ingredients are listed below:

Nutrition facts per 100 g of rice protein powder, according to the manufacturer:

Energy: (1,529.30 kJ/361.30 kcal),Fat: (3.5 g of which saturated fats 1.9 g), Carbohydrates (0.5 g of which sugars 0.5 g), Fibre (3.9 g), Protein (83 g), Salt (0.5 g)

Nutrition facts per 100 g of pea protein powder, according to the manufacturer:

Energy: (1774 kJ/420 kcal), Fat (8.0 g of which saturated fats 2.0 g), Carbohydrates (4.9 g of which sugars <0.5 g), Fibre (4.2 g), Protein (80 g), Salt (1.1 g), Phosphorus (910 mg), Iron (27 mg).

The SA used in this example possessed a viscosity of 200-600 cPs (viscosimeter) when measured at 1% of concentration w/v and temperature of 20° C., according to the manufacturer.

Compositions Preparation

In an example, rice protein (RP) was mixed with sodium alginate (SA) and drinking water as edible solvent. Other edible solvents could be used, such as deionized water, distilled water, oils and/or fruit juices, all optionally including mineral salts and other additives if required. With these ingredients different hydrogel compositions (RP-SA) were generated. To this aim, definite amounts of RP and SA were mixed with water and placed into separate polypropylene containers. The formulations tested possessed several different combinations of RP and SA amounts, where each of the two components was ranging in a concentration ranging from 0 w/w % to 60 w/w %. The polypropylene containers were sealed with Parafilm® (Sigma-Aldrich, Germany) and mixed through a mixer (SpeedMixer DAC 150.1 FVZ; FlackTek, Germany) at 3500 RPM for 10 minutes, until the resulting hydrogel was homogenized.

Microextrusion Evaluation

The ability of the compositions to be microextruded through a thin cross-sectional area was evaluated through a microextrusion test. In this example, this ability was analyzed using a system composed of a 3 cc syringe, a plunger, a precision tip with an internal nozzle diameter of 0.41 mm (Nordson EFD Optimum; Nordson, UK) and a custom-made piston (Fundació CIM, Spain), which was mechanically reinforced for extruding highly-viscous pastes (compositions). The syringe was loaded with the RP-SA compositions using a spatula, and these were manually microextruded in the form of filaments onto a plate, to evaluate which of the compositions could be properly microextruded though a nozzle with an inner diameter of 0.41 mm.

Figure 1B:
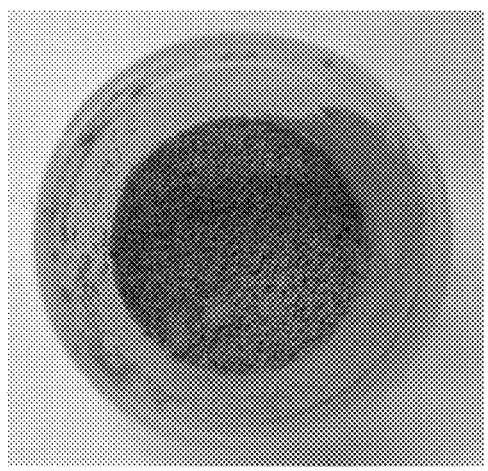

Using the technology described in this invention, it is possible to generate microextrudable homogeneous pastes, of variable viscosity, composed of pseudoplastic protein (or a mixture of proteins) and water, or alternatively composed of a mixture of protein (or a mixture of proteins) and pseudoplastic polymer (or a mixture of pseudoplastic polymers) and water. FIG. 1A depicts an example of a viscoelastic composition (or microextrudable formulation), composed of 25 w/w % of RP, 5 w/w % of SA and 70 w/w % of water. FIG. 1B depicts an example of a non-microextrudable formulation, composed of 45 w/w % of RP and 55 w/w % of water (comparative example).

Figure 2A:
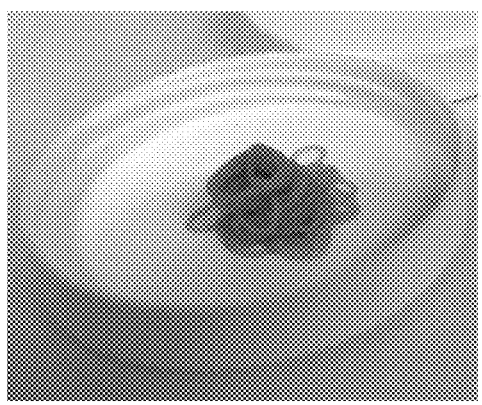
FIG. 2 depicts an example of a formulation generating self-supporting microextruded filaments, composed of 25 w/w % of rice protein, 5 w/w % of sodium alginate and 70 w/w % of water (FIG. 2 A).
Figure 2B:
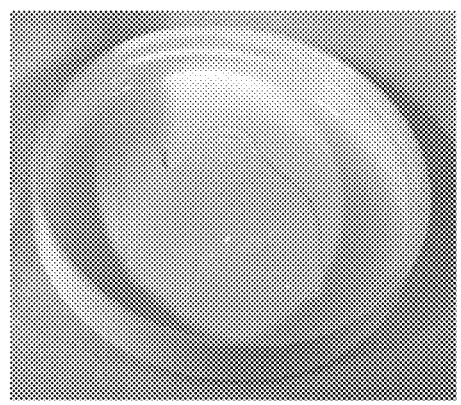

To evaluate the possibility to generate a multi-layered structure by 3D printing, it is possible to select the compositions that can be microextruded in the form of self-supporting continuous elements. In this example, the ability of the RP-SA compositions to form multi-layered self-supporting structures was evaluated using the same extrusion system detailed above. The microextrudable RP-SA viscoelastic compositions selected for this test were the one that passed the microextrusion test described in the previous paragraph, and the filaments generated were manually deposited onto a plate to analyze their self-supporting capability. FIG. 2A depicts an example of a viscoelastic composition or formulation generating self-supporting microextruded filaments, composed of 25 w/w % of RP, 5 w/w % of SA and 70 w/w % of water. FIG. 2B depicts a viscoelastic composition or formulation generating non self-supporting microextruded filaments, composed of 5 w/w % SA and 95 w/w % of water (comparative example).

Multi-Layered Microextruded Products Fabrication

Figure 3A:
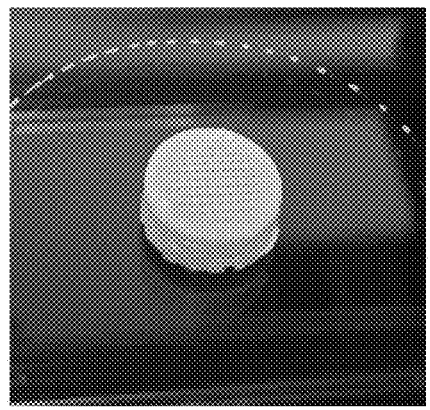
FIG. 3 A and FIG. 3 B depict the process of 3D microextrusion printing of two multi-layered microextruded products, with different composition and viscoelastic moduli. The products depicted in FIG. 3 A and FIG. 3 B were generated using the compositions with 25 w/w % of rice protein, 5% of sodium alginate, and 70 w/w % of water (FIG. 3 A), and 20 w/w % of rice protein, 5% of sodium alginate, and 75 w/w % of water (FIG. 3 B).
Figure 3B:
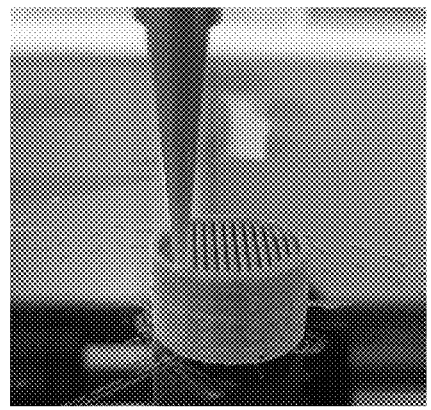

The microextrudable edible viscoelastic compositions able to form multi-layered structures were used to fabricate edible microextruded constructs or products of the invention through an automatic production process. In this example, the RP-SA compositions that demonstrated to form microextruded self-supporting structures were selected to generate multi-layered edible 3D printed products through a direct ink microextrusion technique. CAD models of the cylindrical-shaped structures, with 12 mm of diameter and 10 mm of height, were designed using SolidWorks software (SolidWorks Corp., USA). Then, the Slic3r g-code generator free software was employed to define the printing parameters and generate the desired g-code, which is the programming language supported by the custom-made 3D printer used in this work (BCN3D+ Dual Paste Caster; Fundació CIM, Spain). The g-code used for the fabrication of the cylindrical products in this example was designed to provide an orthogonal filling pattern, 40% filling density (which means that microextruded filaments were disposed defining empty spaces between printed microextruded filaments), 0.41 mm layers height (which means that the microextruded filaments had a diameter or cross-section of 410 µm), and a printing speed of 10 mm/s. The other microextrusion parameters (including syringes of 3 cc-capacity, precision tips nozzle diameter of 0.41 mm, plunger and piston) were the same used for the microextrusion tests described in the previous section of this chapter. FIG. 3 (A and B) depicts the process of 3D microextrusion printing of two multi-layered edible microextruded products, with different composition and viscoelastic moduli. The product depicted in FIG. 3 A and FIG. 3 B were generated using the viscoelastic compositions with 25 w/w % of RP, 5% of SA, and 70 w/w % of water (FIG. 3 A), and 25 w/w % of RP, 25 w/w % of SA, and 50 w/w % of water (FIG. 3 B).

Figure 4:
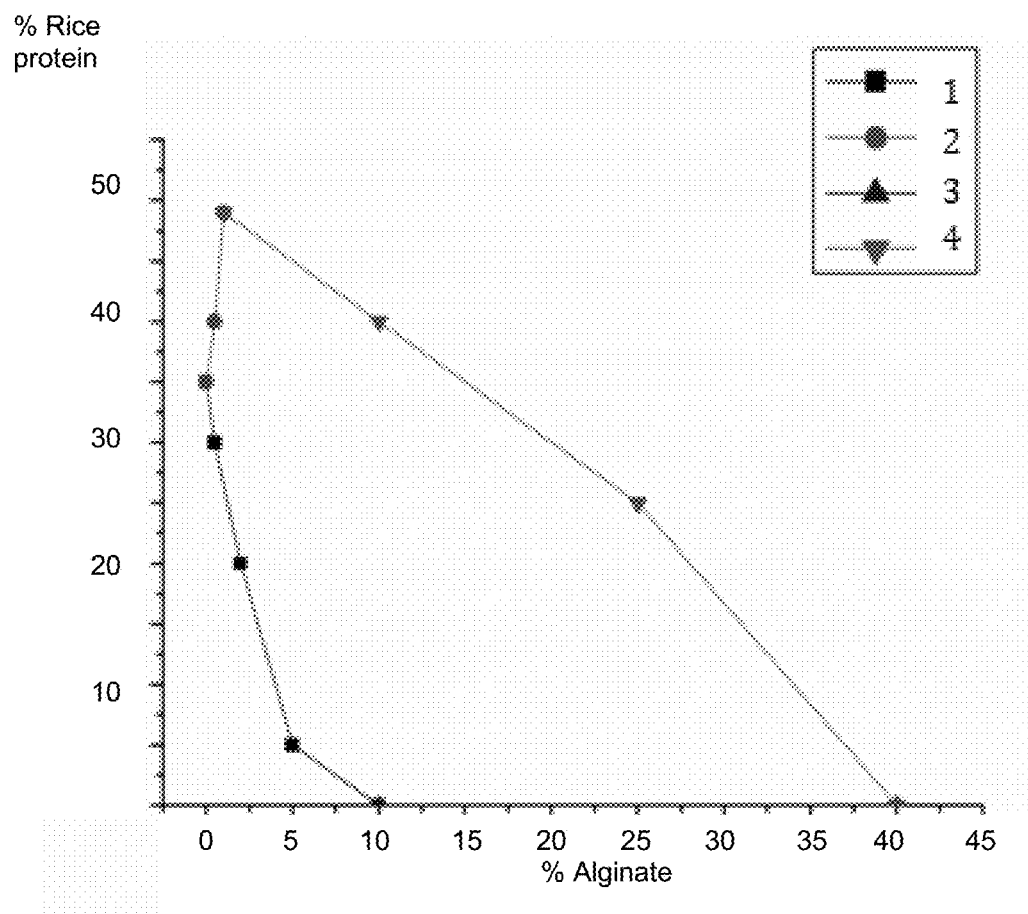
FIG. 4 depicts a XY distribution, where the X and the Y axes represent the sodium alginate and the rice protein concentrations, respectively, and the 3D printable formulations are contained into the area defined by the curves 1, 2, 3 and 4.

In this example, the tests described above allowed evaluating the capability of the RP-SA compositions to generate multilayered microstructured edible products by 3D printing. FIG. 4 depicts a XY distribution, where the X and the Y axes represent the concentrations of sodium alginate (in the 0-40% range) and the rice protein (in the 0-49% range), respectively, and the 3D printable formulations are contained into the area defined by the curves 1, 2, 3 and 4, which were generated by fitting the data points obtained in this example. These are the equations of the curves of this example, obtained using the curve fitting tool of OriginPro 8 Software (OriginLab, USA):

Curve 1 (square): y=[38.01*exp (−x/3.51)−2.77]
Curve 2 (circle): y=[14x+34.33]
Curve 3 (triangle): y=0
Curve 4 (inverted triangle): y=[−28.47*exp (−x/−39.96)+ 77.61]

In this example, after the printing process, a selection of the 3D printed products underwent a crosslinking process at room temperature. In this example, the products were covered with drops of a $CaCl_2$ solution (150 mM in water) at 23° C., during approximately 1 minute to initiate the ionic crosslinking of SA. Then, the products were moved to a well-plate and submerged into the 150 mM $CaCl_2$ solution for 4 additional minutes to complete the crosslinking process, and finally the products were washed with water. Crosslinking by $CaCl_2$ is a technique widely used in gastronomy for the spherification of SA, and it is able to provide enhanced mechanical resistance to several hydrogels, including SA-containing hydrogel structures. Suitable concentrations for the crosslinking are from 50 to 300 mM.

Same results above and indicated below were obtained (data not shown) when using Pea Protein (PP) with SA as pseudoplastic polymer.

Rheological Evaluation of Selected Viscoelastic Compositions

Figure 5A:
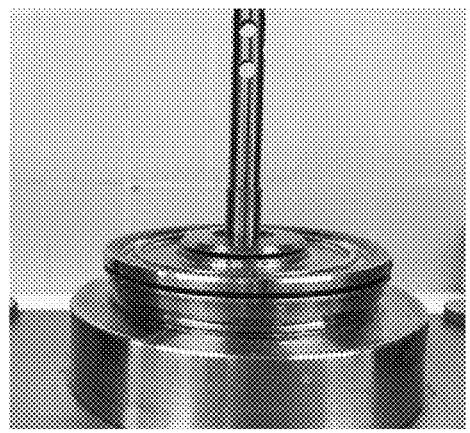
FIG. 5A depicts an illustrative representation of the measurement of the viscoelastic properties of the formulations used to prepare an edible microextruded product according to the invention.
Figure 5B:
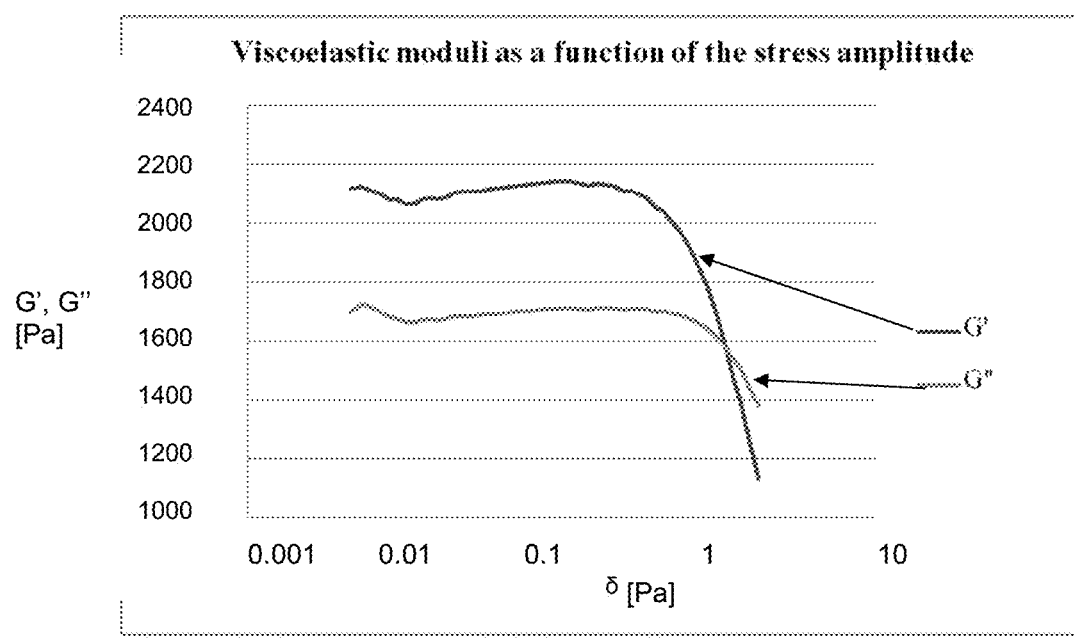
FIG. 5 B depicts a representative measurement of the storage (G') and loss (G') viscoelastic moduli (in Pa), measured as a function of the stress amplitude (σ) in Pa. The graph in FIG. 5 B depicts a representative measurement of the amplitude sweep test conducted on the composition with 20 w/w % of rice protein, 5 w/w % of sodium alginate and 75 w/w % of water according to the invention.

It is possible to analyze the viscoelastic properties of the selected microextrudable viscoelastic compositions through rheological measurements under shear stress. This analysis can serve to evaluate the optimal viscoelastic properties of the compositions that can be properly microextruded in the form of multilayered products. In this example, the viscoelastic properties of the 3D printable compositions were evaluated using a Haake Mars III rheometer (Thermo Fisher Scientific, USA) at 23° C. The measuring system consisted of a pair of parallel serrated plates, to avoid wall slip and provide an enhanced gripping of the hydrogel compositions (viscoelastic compositions comprising protein (RP) and a pseudoplastic polymer (SA)). Before the measurement was started, the top plate was lowered until the hydrogels responded to the compressive stress with a normal force of 5 N: using this methodology, the gap between the plates was approximately 300 μm in all cases of this example. Oscillatory tests were conducted to measure the viscoelastic moduli (storage modulus G' and loss modulus G"), the modulus of the complex viscosity ($|\eta^*|$) and the loss tangent ($\tan(\delta)$), measured as $\tan(\delta)=G''/G'$, which determines the relation between the viscoelastic moduli. To this aim, two different kinds of oscillatory tests were conducted: amplitude sweep and frequency sweep tests. In the amplitude sweep tests, the frequency was fixed at f=1 Hz, and the amplitude of the applied stress ($\sigma$) was increased from 0.005 Pa to 2 Pa, to delimitate the viscoelastic linear region (VLR), which is the region for which the viscoelastic moduli are independent of the stress amplitude, and constant values of the moduli are usually observed. Then frequency sweep tests were conducted, in which the applied stress was fixed at a value within the VLR, and the frequency was varied. Frequency sweep tests allow the evaluation of the behaviour of the viscoelastic moduli under changing frequencies. The loss tangent $\tan(\delta)$ was measured at 0.16 Hz (1 rad/sec). In all tests, the sinusoidal stress at each step of the measuring ramp was maintained for a time equivalent to eight periods of oscillation, and the viscoelastic moduli were recorded during the last five periods, to discard transient values. The mechanical properties of the compositions were measured with the composition in its hydrated form (i.e. the composition was not measured after dehydration processes, such as air-drying, oven-drying, critical-point drying or freeze-drying), when the water content of the composition was ranging from 45% to 90 w/w %, in all cases. FIG. 5 A depicts an illustrative representation of the measurement of the viscoelastic properties of the formulations. FIG. 5 B depicts a representative measurement of the storage (G') and loss (G') viscoelastic moduli, measured as a function of the stress amplitude ($\sigma$). The graph in FIG. 5 B depicts a representative measurement of the amplitude sweep test conducted on the composition with 20 w/w % of RP, 5 w/w % of SA and 75 w/w % of water.

Figure 6:
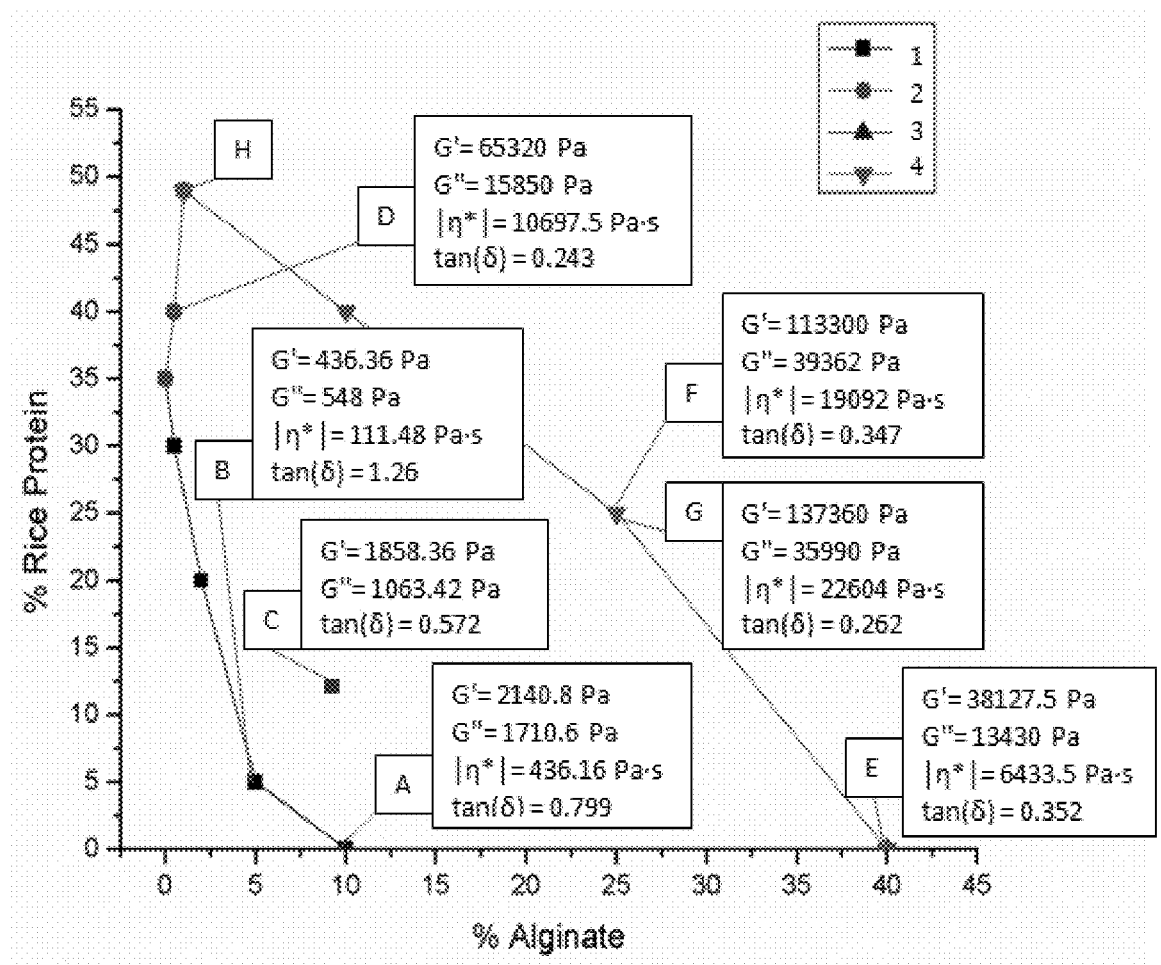
FIG. 6 depicts a XY distribution, where the X and the Y axes represent the sodium alginate and the rice protein concentrations, respectively, and the 3D printable formulations (A-H) are contained into the area defined by the curves 1, 2, 3 and 4, as previously described in FIG. 4. The values associated with each of the compositions [G', G", |η*|, tan(δ)] summarize their viscoelastic parameters.

Further in FIG. 6 a XY distribution is depicted, where the X and the Y axes represent the sodium alginate and the rice protein concentrations, respectively, and the assayed 3D printable formulations (A-H) are contained into the area defined by the curves 1, 2, 3 and 4, as previously described in FIG. 4. The values associated with each of the compositions, specifically G', G", $|\eta^*|$ and $\tan(\delta)$, were calculated to evaluate the rheological properties of the compositions, and were measured as detailed above.

Mechanical Characterization of Multi-Layered Microextruded Products

To evaluate the mechanical resistance of the edible microextruded products, it is possible to measure their mechanical behaviour under tensile and compression stresses. In this example, a servo-hydraulic test system with a 500 N load sensor (MTS Bionix 358, USA) was used to evaluate the mechanical properties of the products under tensile and compressive stresses, at 23° C. The mechanical properties of the products were measured with the product in its hydrated form (i.e. the product was not measured after dehydration processes, such as air-drying, oven-drying, critical-point drying or freeze-drying), when the water content of the product was ranging from 45% to 90 w/w % in all cases. The values of the tensile Young's modulus ($E_Y$), engineering stress at break ($\sigma_B$) and strain at break ($\varepsilon_B$) were calculated under uniaxial tensile loading, and the value of the elastic compressive modulus ($E_C$) was calculated under unconfined uniaxial compressive stress. The clamps displacement rate was kept constant during the experiment, being equal to 1 mm/min for both the tension and compression tests.

Figure 7A:
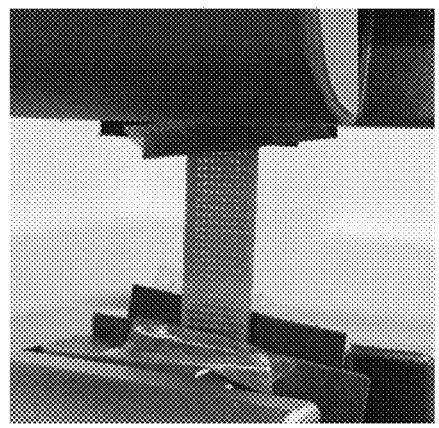
FIG. 7 A depicts an illustrative representation of the measurement of the mechanical properties under tensile stresses of the edible microextruded products.
Figure 7B:
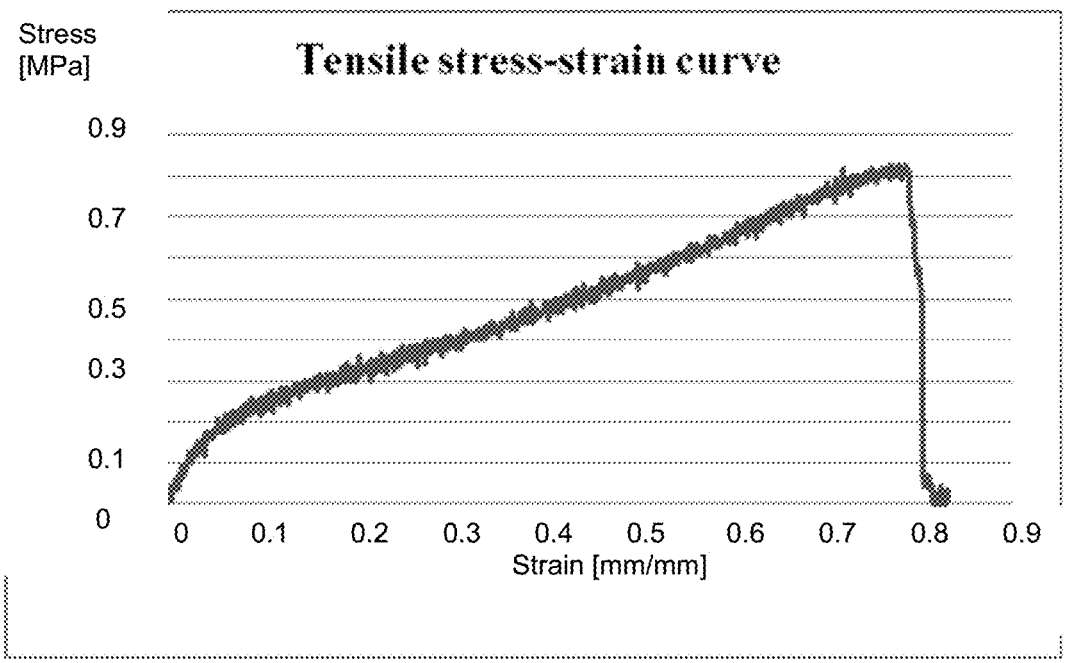

For the tensile tests, cuboid-shaped 3D printed products were designed with a width of 10 mm, a length of 80 mm and a height equal to 1.2 mm. The products were clamped with their length along the direction of the tensile stress. The distance between the clamps of the testing machine was set to 20 mm. Thus, the volume of the samples that underwent tensile stress had dimensions of 10 mm (width)×20 mm (length)×1.2 mm (thickness). The rest of the piece was gripped by the clamps, and the samples were submitted to a tensile stress, at a constant crosshead speed of 1 mm/min, at 23° C. The Young's modulus was calculated as the slope of the initial, linear portion of the stress-strain curve, while the engineering stress at break ($\sigma_B$) and the engineering strain at break ($\varepsilon_B$) were determined at the point of fracture, which was followed by a fast decrease of the stress values. FIG. 7 A depicts an illustrative representation of the measurement of the mechanical properties under tensile stresses of the edible microextruded products of the invention. FIG. 7 B depicts a representative measurement of the engineering stress-strain curve, when a product was subjected to tensile stresses. The engineering stress-strain curve in FIG. 7 B depicts a representative tensile test conducted on the product generated using the composition with 25 w/w % of RP, 25 w/w % of SA and 50 w/w % of water.

Figure 8A:
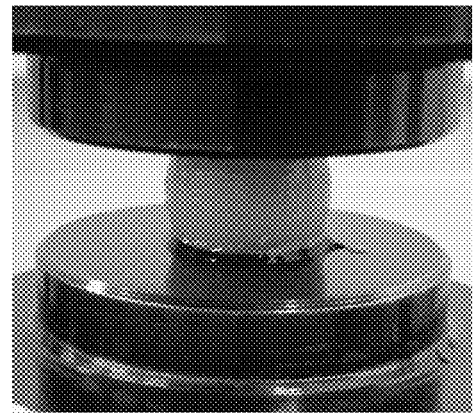
FIG. 8 A depicts an illustrative representation of the measurement of the mechanical properties under compressive stresses of the edible micro-extruded products.
Figure 8B:
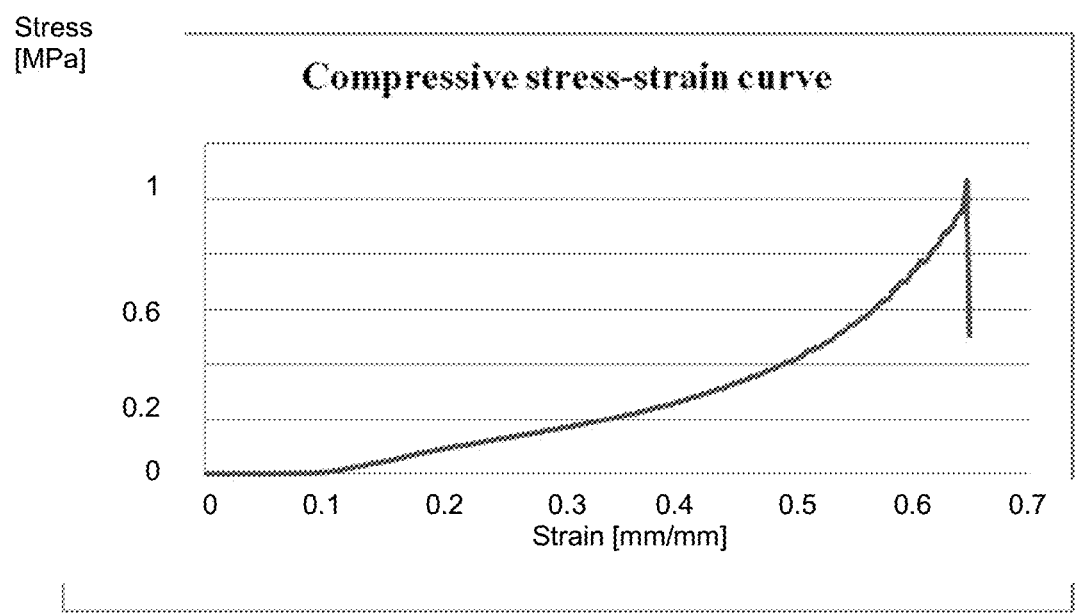

For the compression tests, cylinder-shaped 3D printed products were designed to possess a diameter of 12 mm and a height equal to 15 mm. The samples were placed so that the round base of the cylinder would be in contact with the compression plates, which were unlubricated and impermeable. Then the samples were submitted to an unconfined compression stress, at a constant crosshead speed of 1 mm/min, at 23° C. The elastic compressive modulus was determined from the slope of the engineering stress-strain curve at 15% strain. Equivalent modes of measurement include the measurement of the slope of an engineering stress-strain curve at strain from 10% to 60%. FIG. 8 A depicts an illustrative representation of the measurement of the mechanical properties under compressive stresses of the edible micro-extruded products. FIG. 8 B depicts a representative measurement of the engineering stress-strain curve, when a product was subjected to compressive stresses. The engineering stress-strain curve in FIG. 8 B depicts a representative compression test conducted on the product generated using the composition with 25 w/w % of RP, 25 w/w % of SA and 50 w/w % of water.

Figure 9:
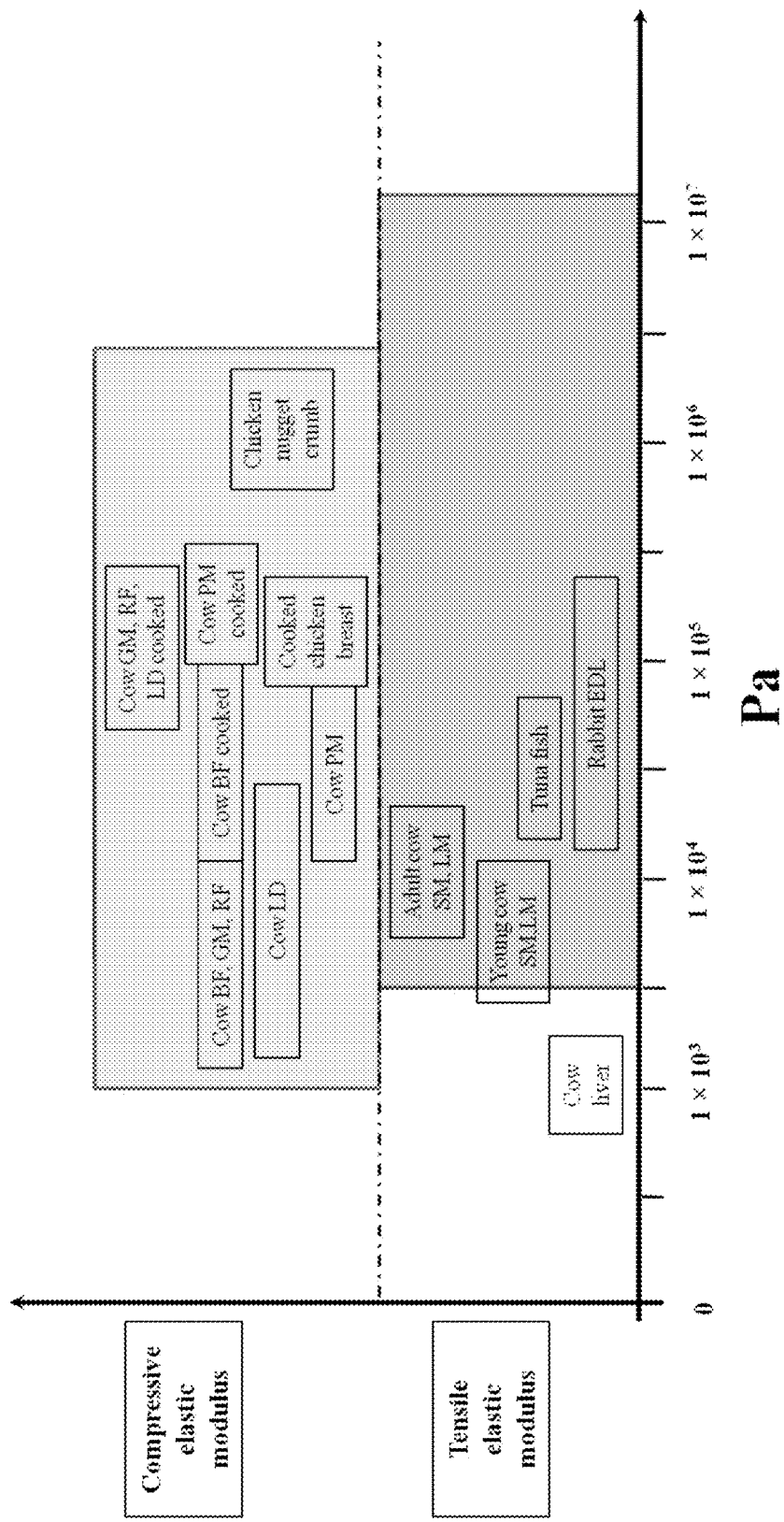
FIG. 9 depicts a graph representing the ranges of compressive elastic modulus and tensile Young's modulus of the edible microextruded products according to the invention. Shadowed rectangles represent the ranges covered by the products.

Potential Applications of Multi-Layered Microextruded Products for Food Engineering The evaluation of the resistance of the products to tensile and compressive stresses proves the potential of the microextruded multilayered products generated in this examples for food engineering applications. Specifically, the products generated in this example showed elastic moduli under tensile and compressive stresses in the same range of a variety of natural edible materials, including several types of meat. FIG. 9 depicts a graph representing the ranges of compressive elastic modulus and Young's modulus of the edible products of this example (products of the invention with the viscoelastic compositions into the area defined by the curves 1, 2, 3 and 4, in FIGS. 4 and 6). Shadowed rectangles represent the ranges covered by the products. Small transparent rectangles represent the compressive and tensile elastic moduli of some specific edible materials, according to literature:

Tensile Young's Modulus

Tuna fish—Ey=50 kPa—from Ogawa et al., "Measurement of Young's Modulus and Poisson's Ratio of Tuna Fish". Transactions of the Japan Society of Refrigerating and Air Conditioning Engineers, Volume 9, Issue 3, pp. 283-290 (2011);

Adult cow muscles—Ey longissimus muscle (LM)=15 kPa, Ey semimebranous muscle (SM)=10 kPa; Young bull muscles—Ey longissimus muscle=8 kPa, Ey semimebranous muscle=7.5 kPa from M-R. Lapin et al. "Substrate elasticity affects bovine satellite cell activation kinetics in vitro", J Anim Sci.-2013, vol. no. 91(5), pp. 2083-2090, doi: 10.2527/jas.2012-5732.

Bovine liver—Ey=0.94 kPa from Chen et al., "Young's modulus measurements of soft tissues with application to elasticity imaging", IEEE Transactions on Ultrasonics, Ferroelectrics, and Frequency Control, Volume 43, Issue: 1 (1996). doi: 10.1109/58.484478.

New Zealand White Rabbit extensor digitorum longus (EDL) muscles—Ey longitudinal test=447 kPa—Ey transversal test=22.4 kPa, from Morrow et al., "Transversely isotropic tensile material properties of skeletal muscle tissue" J Mech Behav Biomed Mater. 2010 January; 3(1):124-9. doi: 10.1016/j.jmbbm.2009.03.004.

Compressive Elastic Modulus

Cooked chicken breast—119-150 kPa, from U-Chupaj et al., "Differences in textural properties of cooked caponized and broiler chicken breast meat", Science—2017, vol. no. 1; 96(7), pp.: 2491-2500. doi: 10.3382/ps/pex006.

Chicken nuggest crumb—3 MPa, from Jahanbakhshian N et al., "Measurement and prediction of the mechanical properties of a two-component food during freezing.", International Journal of Food Properties-2017, vol. no. 20(3), pp.: S3088-S3095. doi: 10.1080/10942912.2016.1247856.

Beef longissumus dorsi (LD) muscle—3 kPa, from Chen E et al., "Ultrasound elasticity measurements of beef muscle" of IEEE Ultrasonics Symposium ULTSYM-94, Vol. 3, (1994), 1459-1462. doi: 10.1109/ULTSYM.1994.401867.

Beef muscle, from Segars R et al., "Textural characteristics of beef muscles, Journal of Texture Studies 5 (1974) 283-297. doi: 10.1111/j.1745-4603.1974.tb01436.x Ec biceps femoris (BF): raw = 6-34 kPa   cooked = 20-122 kPa
Ec gluteus medius (GM): raw = 7-28 kPa   cooked = 140-230 kPa
Ec longissimus dorsi (LD): raw = 19-62 kPa   cooked = 105-144 kPa
Ec psoas major (PM): raw = 30-130 kPa   cooked = 190-266 kPa
Ec rectus femoris (RF): raw = 12-27 kPa   cooked = 156-215 kPa According to the values of the tensile Young's moduli and compressive elastic moduli of the edible materials, the products generated in this example match the properties of a number of meat types, including meat from cow muscles and tuna fish, supporting the potential usefulness of the microextruded multi-layered products as meat analogues. As can be deduced from this FIG. 9, the mechanical properties of the products are in the same order of magnitude of a variety of meat types (transparent areas of the graph), including meat from different cow muscles and liver, rabbit muscle, chicken breast and chicken nuggets, and tuna fish. This property of the microextruded products supports the potential usefulness of the generated products as meat or fish analogues. Coloured rectangles represent the ranges of elastic moduli covered by the products described in this example. Transparent rectangles represent the values of the elastic moduli measured in literature for a variety of meat and fish.

Microscopic Evaluation of Multi-Layered Microextruded Products

The analysis of the edible microextruded multilayered products can serve to select the optimal viscoelastic compositions and microextrusion parameters to generate a tridimensional structure that resembles better the initial dimensions of the CAD models, at the macrostructural level, and provides an high quality of the microextruded elements, at the microstructural level. In this example, the structure of the 3D printed products was characterized from a microscopic viewpoint by means of scanning electron microscopy (SEM). To this aim, the products were prepared for SEM visualization by a process of freezing in liquid nitrogen, freeze-drying (Cryodos; Telstar, Spain), sectioning in longitudinal and transversal planes, placing on aluminium stubs, and sputter coating with carbon (Sputter Coater SCD005; BAL-TEC, Liechtenstein). Then, the products were observed in a scanning electron microscope (Neon 40; Zeiss, Germany). FIG. 10 A and B depict representative scanning electron microscopy images of the micro-structure of a selected product, taken at 10 kV and with a magnification of 200×, from top-view and transversal view angles, respectively. The product depicted in these images was generated selecting n highly viscous composition, with 25 w/w % of RP, 25 w/w % of SA, and 50 w/w % of water. The SEM images of the products in these examples showed that, compared to how the microstructure was designed in the gcode files, the micro-filaments within the products kept the proper pattern and ordered direction that was designed, and adequate dimensions of the filament diameters and of the porosities within the filaments. In addition, the macroscopic geometrical evaluation of cylinder-shaped products described in these examples, measured with a digital caliper, showed that the products maintained the same macro-structure designed in the CAD files, both in terms of height and base diameter, without showing significant shrinking or expansion effects on the geometry of the products.

To observe the presence of a preferred and anisotropic distribution of nanometric fibres in the inside of each of the microextruded filaments, the orientation of the nanofibres in a selection of compositions was evaluated taking SEM images at higher magnification (15000×). FIG. 11 A and B depict representative scanning electron microscopy images, taken at 5 kV, of the micro-structure of a selected product, at 200× and 15000× of magnification, respectively. FIG. 11 B represents a magnification of the same image depicted in FIG. 11 A; at higher magnification, it was possible to observe an alignment in the direction of the nanofibres, which are contained on the inside of a single microextruded filament. The orientation of the nanofibres was directed in same direction of the microfilament. The product depicted in these images was composed of 25 w/w % of RP, 5 w/w % of SA, and 70 w/w % of water.

Fabrication of Multi-Layered Microextruded Meat Analogue Products

Figure 12:
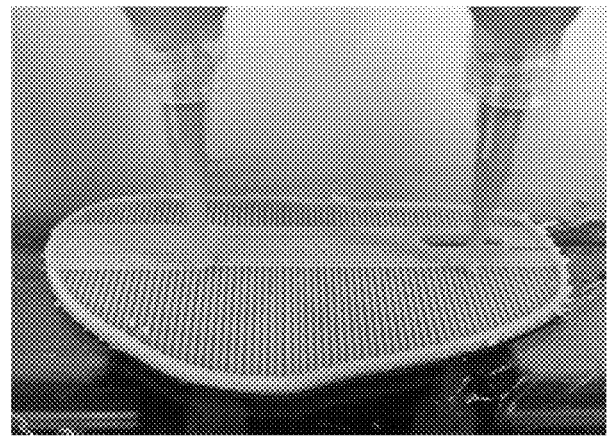
FIG. 12 depicts an illustrative representation of the 3D microextrusion printing process of a meat-analogue product, which was generated using two different compositions, each one in a separate extruder, and alternating the two extruders at each layer: specifically, one of the extruders used in this example generated layers with the composition of 25 w/w % of RP, 5 w/w % of SA, and 70 w/w % of water, while the other extruder generated layers with the composition of 25 w/w % of RP, 25 w/w % of SA, and 50 w/w % of water.

Using the technology described in this invention, it is possible to fabricate complex-shaped multi-layered microextruded products, with a tridimensional shape resembling that of a beefsteak, and meat-mimetic mechanical properties in terms of consistency, integrity, deformability, elasticity, and a fibrous texture typical of meat. In this example, CAD models of beefsteak-shaped structures were designed using SolidWorks software (SolidWorks Corp., USA). Then, the Slic3r g-code generator free software was employed to define the printing parameters and generate the desired g-codes, as described for previous examples in this document. A custom-made 3D printer (BCN3D+ Dual Paste Caster; Fundació CIM, Spain) was used to generate different products, with variable weights in the range of 10-100 grams in this example. In this regard, it is possible to use this technology to generate products with a wide range of weights and dimensions. The g-codes used for the fabrication of the cylindrical products were designed to provide 35 filling density (percentage of microextruded filaments in the surface of the layer of 35%) and 0.41 layers height. The majority of other main printing parameters were similar to the ones detailed in the examples of the previous section of this chapter. However, it was possible to design some parameters to be different from the previous examples, specifically: different filling patterns (rectilinear with different angle orientations when varying layers, hilbert curve patterns, honeycomb structures, and others), presence or absence of an external perimeter, higher printing speed (5-60 mm/s), two bigger syringes of 5 cc or 10 cc of capacity (Nordson EFD Optimum; Nordson, UK), and two separate coordinated microextruders that could be alternatively or subsequently employed, either to generate different layers with different extruders and compositions, or to generate different part of the same layers with different extruders and compositions. FIG. 12 depicts an illustrative representation of the 3D microextrusion printing process of a meat-analogue product, which was generated using two different compositions, each one in a separate extruder, and alternating the two extruders at each layer: specifically, one of the extruders used in this example generated layers with the composition of 25 w/w % of RP, 5 w/w % of SA, and 70 w/w % of water, while the other extruder generated layers with the composition of 25 w/w % of RP, 25 w/w % of SA, and 50 w/w % of water.

Fabrication of Meat Analogue Products Containing all Essential Aminoacids.

Figure 13:
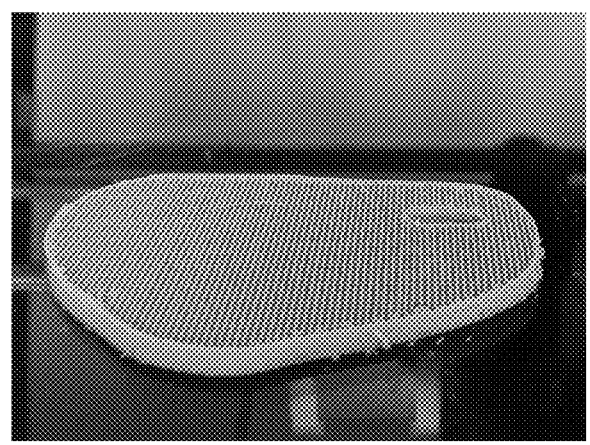
FIG. 13 depicts an example of a completed edible multilayered microextruded meat analogue product, which was generated using a composition with 12.5 w/w % of rice protein, 12.5 w/w % of pea protein, 5 w/w % of SA and 70 w/w % of water.

The technology described in this invention allowed achieving the generation of meat analogue products that are similar to meat from animals also in terms of nutritional properties, i.e. fabricating products that can contain all and a selection of vitamins, minerals and lipids within its nutritional values, among other nutrients. In this example, this invention can be used to generate products with all essential amino acids, but using only proteins from non-animal origin. In this example, the technology described in this invention was employed to generate multi-layered microextruded meat analogue products containing all essential amino acids, only from non-animal based origins, using a composition containing both rice protein and pea protein. FIG. 13 depicts an example of a completed multi-layered microextruded meat analogue product, which was generated using a composition with 12.5 w/w % of rice protein, 12.5 w/w % of pea protein, 5 w/w % of SA and 70 w/w % of water. In another example, a meat analogue product containing all essential amino acids from plant-based origin, and selection of carbohydrates, fats, vitamins, minerals, dietary fibres and an edible red dye was fabricated, using the methodology described in this invention.

Example 2. Pasteurization and Cooking of the Edible Microextruded Products of the Invention Pasteurization of Meat-Analogue Products To demonstrate the possibility to store and package products obtained through the methodologies described in this invention, a selection of products from these examples were submitted to a temperature at 72° C.-80° C. during 1 hour, or alternatively to three cycles of submission to 72° C. during 30 minutes, per each cycles. After that, the products showed no significant change in the macroscopic morphology. This test was meant to demonstrate that it is possible to apply a pasteurization process to products obtained with the technology described in this document, which makes the technology described in this invention interesting for specific applications where it is important to increase the shelf-life of the products, for storing, packaging and transportation purposes.

Cooking Evaluation of Meat Analogue Products

To evaluate the behaviour of the multi-layered microextruded products generated in the examples of this invention, meat analogue products were cooked in a pan, in an oven, in a microwave oven and by steamcooking. In an example, multilayered microextruded products, generated using a composition with 12.5 w/w % of rice protein, 12.5 w/w % of pea protein, 5 w/w % of SA and 70 w/w % of water, were cooked in a pan alongside pieces of chicken breast using the same cooking process, to compare the behaviour of the two foods when cooked. The time of cooking was varied from 5 to 10 minutes, and the cooking was conducted both in presence and in absence of a teaspoon of extra-virgin olive oil. After cooking the selected microextruded products and the chicken breasts, manipulating and eating the two foods showed that they possessed similar properties in terms of consistency, integrity, deformability, elasticity and fibrous texture, all properties typical of a wide variety of meat food. FIG. 14 A and FIG. 14 B depict representative images obtained during the cooking process in a pan of the products described in this example, compared with a piece of chicken breast meat. In FIG. 14 A, a product, generated according to the invention, is located in the right part of the image, while the chicken breast meat is located on the right part of the images. In FIG. 14 B, another product, generated according to the invention, is located in the bottom part of the image, while the chicken breast meat is located on the top part of the images.

All the compositions and edible products made from them showed self-supporting capabilities. The viscoelastic compositions showed pseudoplastic properties under rotational rheological tests, which contributed to the good printability. Printing processes speed was varied between 10 mm/sec and 50 mm/sec. Printed edible products kept their 3D shape thanks to their specific shear-thinning properties.

As illustrated, addition of a cross-linker such as $CaCl_2$) improved the mechanical properties of the edible microextruded product.

Thus, an entirely novel biomimetic product was developed by printing technology. Meat-mimetic 3D printed food looked and tasted like meat, but using only natural non-animal based ingredients.

It is possible to select a wide-range of non-animal based ingredients, including both plant- and algae-based materials, depending not only on the desired modifications to the texture and taste of the printed food, but also on its nutritional specifications. In fact, it is possible to control the types and quantities of the non-animal-based proteins, carbohydrates and fats that are contained in the viscoelastic composition and/or in the edible microextruded product, by adding the specific ingredients to the printable mixture, in either liquid or solid form.

With the above-defined methods, in addition, it is possible to achieve a fast and reproducible printing (or other type of microextrusion) of the food in complex tridimensional structures, impossible to achieve with other techniques, just defining the desired macro-shape and sending the information to the 3D printer or the elements of the microextruding device. It is even possible to choose to print a very complex structure such as the one of a beef steak.

As a conclusion from the examples, it has been demonstrated that present invention allows producing multi-layered microextruded food products with mechanical properties in the same orders of magnitude of different foods, in particular including various types of meat, through to the use of defined edible viscoelastic compositions and specific microextrusion processes. In addition, this invention permits fabricating multi-layered (at least two layers) edible microextruded products that exhibit desired and customized properties in terms of tridimensional macro-shapes, defined patterns and distribution of the micro-elements within the product, and anisotropic orientation of the nano-fibres within both the micro-elements and the product. In addition, it was possible to customize the nutritional values of the viscoelastic compositions and of the multi-layered microextruded products, so that that they possessed a high and variable content of proteins, and definite and tunable amounts of water content and other nutrients. In particular, it is possible to produce viscoelastic compositions and multi-layered microextruded products that possess nutritional properties in the range of those of a variety of types of meat. In an example, it is described the production of edible meat analogues with personalized nutritional values and all the essential amino acids, with the additional possibility of using compositions that contains only edible materials of natural ingredients of plant origin. The ability of generating microextruded edible three-dimensional products that mimic the characteristic texture, consistency, and nutritional values of meat, and the possibility of using only ingredients of non-animal origin, makes this invention interesting for three main reasons. First, it contributes to the improvement of the global public health, by generating products that are adequate for a diet comprising a variety of protein and specific nutrients amounts. Second, this technology aims at improving the nutritional content of food consumed in the rural regions of the planet, to fight the common problem of lack of certain nutrients such as essential amino acids, minerals and vitamins that are necessary for a balanced diet. The food produced through this technology can be pasteurized and packaged, to be stored and transported to inaccessible areas, allowing for a correct preservation of the food. Third, it promotes a social and economic movement towards a more sustainable agriculture and livestock system, as finding healthy alternative strategies to meat produced from animals seems fundamental and urgent.

Example 3. Viscoelastic Compositions Comprising Pea Protein and Carrageenan, or Pea Protein and Gellan Gum. Edible Microextruded Product Printed with the Viscoelastic Composition Materials For the production of the edible compositions described in these examples, the materials used were water, pea protein, carrageenan and gellan gum. Pea protein (Raab Vital Food GmbH, Germany), carrageenan (Sigma-Aldrich) and gellan gum (Sigma-Aldrich) were purchased in the form of soluble powders, and were certified to be edible by the respective manufacturers. Carrageenan is a natural polysaccharide extracted from seaweed that is widely used in gastronomy, and can be used for their gelling, thickening, and stabilizing properties. Gellan gum is a polysaccharide produced from a bacterial fermentation that has several uses in gastronomy as gelifying, texturizing, and stabilizing agent for foods. Both carrageenan and gellan gum can be used to form hydrogels with strong pseudoplastic behavior.

Compositions Preparation

Using the process described in example 1, pea protein (PP) was mixed with either carrageenan (CG), or gellan gum (GG), or sodium alginate (SA), and drinking (or potable) water as edible solvent. Other edible solvents could be used, such as deionized water, distilled water, oils and/or fruit juices, all optionally including mineral salts and other additives if required. With these ingredients different hydrogel compositions (PP-CG and PP-GG) were generated. To this aim, definite amounts of PP and CG (or GG) were mixed with water and placed into separate polypropylene containers. The formulations tested were composed of:

a) 73 w/w % of water, 25 w/w % PP and 2 w/w % CG
b) 75 w/w % of water, 20 w/w % PP and 5 w/w % CG
c) 73 w/w % of water, 25 w/w % PP and 2 w/w % GG
d) 75 w/w % of water, 20 w/w % PP and 5 w/w % GG
e) 73 w/w % of water, 25 w/w % PP and 2 w/w % SA
f) 75 w/w % of water, 20 w/w % PP and 5 w/w % SA The polypropylene containers were sealed with Parafilm® (Sigma-Aldrich, Germany) and mixed through a mixer (SpeedMixer DAC 150.1 FVZ; FlackTek, Germany) at 3500 RPM for 10 minutes, until the resulting hydrogel was homogenized.

Microextrusion Evaluation and Multi-Layered Microextruded Products Fabrication

Using the same process described in the "MICROEXTRUSION EVALUATION" section of Example 1 of this document, the compositions were successfully microextruded in the form of filaments, demonstrating that the compositions could be properly microextruded through a nozzle, with an inner diameter of 0.41 mm, or alternatively 0.84 mm. Using the technology described in this invention, it is possible to generate homogeneous pastes composed of a mixture of proteins, pseudoplastic polymers and water, of variable viscosity, and adequately microextrude the compositions. FIG. 15 depicts an example of a microextrudable viscoelastic formulation composed of 75 w/w % of water, 20 w/w % PP and 5 w/w % CG.

Figure 16:
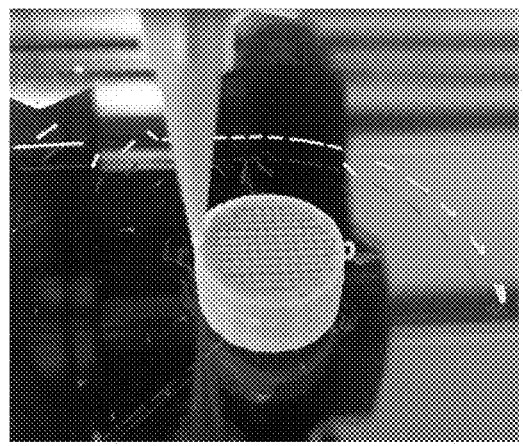
FIG. 16 depicts the process of 3D microextrusion printing of a multi-layered microextruded product generated using a viscoelastic compositions with 73 w/w % of water, 25 w/w % of Pea Protein (PP), 2% of gellan gum (GG).

In addition, using the same process described in "MULTI-LAYERED MICROEXTRUDED PRODUCTS FABRICATION" sections of Example 1 of this document, it was shown the possibility to the PP-CG and alternatively PP-GG compositions described above to form multi-layered self-supporting structures through a microextrusion process, such as a 3D microextrusion printing process. As an example, the product depicted in FIG. 16 was generated using the viscoelastic compositions with 73 w/w % of water, 25 w/w % of PP, 2% of GG. In this example, the tests described above allowed evaluating the capability of the compositions to generate multilayered microstructured edible products by a microextrusion automated process.

Similar results were obtained when PP was substituted by RP with the same formulations.

Example 4. Generation of Edible Microextruded Products Comprising Cells

Generation of the Microextrudable Compositions Comprising Cells

For the production of the edible compositions described in these examples, the materials used were water, phosphate buffered saline, gelatin and sodium alginate. Gelatin (Type B Rousselot) and Sodium Alginate (Special Ingredients Ltd, or alternatively BioChemica Panreac A3249) were purchased in the form of soluble powders. Sodium alginate is a biocompatible natural polysaccharide extracted from seaweed, gelatin is a biocompatible natural ingredient derived from denaturation of the collagen protein. These are edible materials are widely used in gastronomy, and both can be used to form hydrogels with, with pseudoplastic behaviour.

Sodium alginate (SA), Gelatin (GEL) and phosphate buffered saline (PBS, Sigma-Aldrich) were used to generate the microextrudable compositions. A pasteurization process was used to reduce pathogens: for this reason, the alginate and gelatin powders were separately weighted, placed in two glass containers slightly opened, and submitted to three cycles of 72° C. during 30 minutes. Alternatively, alginate and gelatin were submitted to a Plasma exposure process, with oxygen gas at low pressure, to sterilize the materials. To prepare the microextrudable compositions (2 grams each sample), the formulations were mixed at 3500 rpm during 10 minutes, as described in section "COMPOSITIONS PREPARATION" in Example 1 of this document. In an example, a formulation composed of 78 w/w % of PBS (Sigma-Aldrich), 20 w/w % of Gelatin and 2 w/w % of Alginate was used. In another example, the PBS was substituted by water.

To generate cells-embedding microextrudable formulations (also definable as bioinks), $5*10^6$ mammal cells/mL were added to the compositions, suspended in a small quantity of 250 µL of cell culture medium (DMEM high glucose, Thermo Fisher Scientific). Then, the cells were embedded into the bioinks manually, gently mixing the cells suspensions and the bioinks with a spatula, or through a system of two connected syringes. Alternatively, the composition previously mixed can be mixed with the cells using automatic centrifugal system to a speed from 10 g or 60 g (rcf) to 100 g to obtain an homogeneous compositions without damaging cells.

In another example, the same microextrudable formulations were generated, but without embedding the cells in the compositions (also definable as inks for cells-seeding).
Process of Microextrusion and Fabrication of Edible Microextruded Cells-Embedding Products, and Products Seeded with Cells The cells-embedding formulations were used to produce edible micro-extruded cell-based meat substitutes, using a 3D microextrusion printing process, as described in section "FABRICATION OF MULTI-LAYERED MICROEXTRUDED MEAT ANALOGUE PRODUCTS", in the Example 1 of this document.

In another example, the edible microextruded compositions not containing the cells (inks for cell-seeding) were processed through the same 3D microextrusion printing process described for the bioinks. Then, $5*10^6$ mammal cells/mL were suspended in a small quantity of 250 µL of cell culture medium (DMEM high glucose, Thermo Fisher Scientific) and were seeded on the microextruded products.

Afterwards, the microextruded products were crosslinked with DMEM high glucose cell culture medium containing 100 mM $CaCl_2$ at room temperature, during 10 minutes. Then, the samples were washed 3 times with non-supplemented DMEM high glucose cell culture medium at room T, to expel excess of $CaCl_2$ from the samples, and the edible cell-based meat substitute products were stored in incubator for cell culture, in 6-well plates, submerged in supplemented DMEM high glucose cell culture medium and cultured for different time periods, changing the cell culture medium every 48 hours.
Microscopic Evaluation of Multi-Layered Cell-Based Microextruded Products The analysis of the edible multilayered cell-based products was conducted to evaluate the cell viability of the mammal cells embedded or seeded within the microextruded samples. In an example, a Live-Dead method (Live-Dead cell-imaging kit, Invitrogen) was used at 48 hours from the incubation time, to evaluate the cell presence and viability in the products.

To conduct the imaging method, the samples were washed with a solution of DMEM cell culture medium at room T. To prepare negative control samples, some products were submerged with 0.1% Triton (10 mL cell culture medium+10 µL Triton) at 37 degrees. Then, the samples were submerged into the Live-Dead solution (10 mL PBS+5 µL Calcein-AM+ 20 µL Propidium Iodide), and were incubated during 20 minutes at 37 degrees. After washing them with PBS, they were evaluated using a confocal microscope (Leica). Microscope images (not shown) depicted that samples with cells embedded into the bioinks, and with cells seeded on the microextruded products contained viable cells. It was possible to observe a high cellular viability within the samples in terms of percentage of live cells (green dots), compared to the percentage of dead cells (red dots). The analysis of the percentage of live cells in the microextruded products, both in the case for cell-seeded samples and cell-embedding samples, demonstrated a high cell viability in both cases. The results showed that an average of 79% of the cells in the cell-seeded samples were alive, and an average of 75% of the cells in the cell-embedding samples were alive, as showed in Table 1.

TABLE 1

| Cell viability | |
|---|---|
| Sample: | Percentage of live cells on the total number: |
| Cell-seeded microextruded sample | 79% live cells |
| Cell-embedding microextruded sample | 75% live cells |

Further aspects/embodiments of the present invention can be found in the following clauses:

Clause 1.—An edible microextruded product comprising two or more layers of viscoelastic microextruded elements, wherein each extruded element comprises protein, an edible pseudoplastic polymer and an appropriate edible solvent, wherein:
  the percentage by weight of protein in relation with total weight of the microextruded element is from 19% to 49%, and the percentage by weight of edible solvent in relation with total weight of the microextruded element is at least 45%;
  the microextruded elements have a cross section width from 10 μm to 1000 μm;
  the compressive elastic modulus of the edible microextruded product is from $1.0 \times 10^3$ Pa to $5.0 \times 10^6$ Pa and the tensile Young's modulus of the edible microextruded product is from $5.0 \times 10^3$ Pa to $11.0 \times 10^6$ Pa, said compressive elastic and the tensile Young's moduli measured in a servo-hydraulic test system with a clamp displacement rate equal to 1 mm/min, at 23° C. and with a solvent amount in the edible microextruded product from 45% to 90% w/w; and
  the two or more layers of microextruded elements are stacked in such a way that a vertical section of the edible microextruded product shows intersected microextruded elements within a layer, or microextruded elements superimposed and differentially oriented between the different layers; or alternatively the two or more layers are stacked in such a way that microextruded elements between layers are oriented in parallel.

Clause 2.—The edible microextruded product according to clause 1, made of a viscoelastic composition comprising the protein, the edible pseudoplastic polymer, and the appropriate edible solvent, wherein the percentage by weight of protein, edible pseudoplastic polymer and of the edible solvent with respect to the viscoelastic composition is the same percentage than in the microextruded element.

Clause 3—The edible microextruded product according to any one of clauses 1-2, wherein the microextruded elements are selected from microextruded sheets, microextruded filaments and combinations thereof.

Clause 4—The edible microextruded product according to any one of clauses 1-3, wherein the percentage by weight of protein is from 25% to 49%, and the percentage by weight of edible solvent is at least 45%.

Clause 5.—The edible microextruded product according to any one of clauses 1-3, wherein the percentage by weight of protein is from 29% to 49%, and the percentage by weight of edible solvent is at least 45%.

Clause 6.—The edible microextruded product according to any one of clause 1-5, wherein the protein is selected from non-human animal origin protein, plant origin protein, algae origin protein, yeast origin protein, bacterial origin protein, and combinations thereof.

Clause 7.—The edible microextruded product according to any one of clauses 1-6, wherein the percentage by weight of edible pseudoplastic polymer in relation with total weight of the microextruded element is from 0.2% to 40%, and the percentage by weight of edible solvent is at least 45%.

Clause 8.—The edible microextruded product according to any one of clauses 1-7, wherein the edible pseudoplastic polymer is selected from a polysaccharide, a pseudoplastic protein, and combinations thereof.

Clause 9.—The edible microextruded product according to clause 8, wherein the pseudoplastic polymer is a polysaccharide selected from alginic acid, and an edible salt of alginic acid, xanthan gum, glycosaminoglycans, agarose, gellan gum, pectin, and combinations thereof.

Clause 10.—The edible microextruded product according to any one of clauses 2-9, wherein the said viscoelastic composition has a storage modulus G' higher than the loss modulus G" when measured at 0.16 Hz and at a temperature of 23° C. in a pair of parallel serrated plates and with a solvent amount in the edible microextrudable composition from 45% to 90% w/w; being the storage modulus G' equal to or higher than 1700 Pa and the loss modulus G" equal to or higher than 350 Pa, and the ratio G"/G' in the viscoelastic composition being from 0.24 to 0.88.

Clause 11—The edible microextruded product according to clause 10, wherein storage modulus G' of the viscoelastic composition is from 1700 Pa to 140000 Pa, and the loss modulus G" of the viscoelastic composition is from 350 Pa to 40000 Pa; and wherein the ratio G"IG' in the viscoelastic composition is from 0.24 to 0.88.

Clause 12.—The edible microextruded product according to any one of clauses 1-11, wherein the viscoelastic microextruded element or the viscoelastic composition further comprises edible additives selected from the list consisting of emollients, flavour compounds, aromatizing compounds, lipids, colourants, metal chelants, oligoelements, vitamins, minerals, and combinations thereof.

Clause 13.—The edible microextruded product according to any one of clauses 1-12, wherein the layers are made of microextruded filaments disposed in parallel and adjacent with an percentage of microextruded filaments in the surface of the layer from 25% to 100%.

Clause 14. A process for the manufacturing of the edible microextruded product as defined in any one of clauses 1-13, comprising the steps of:
  (i) providing a viscoelastic composition comprising in an appropriate edible solvent, protein and an edible pseudoplastic polymer, said viscoelastic composition comprising a percentage by weight of protein from 19% to 49%, and at least 45% of edible solvent, both percentages in relation with total weight of the viscoelastic composition;
  (ii) microextruding the viscoelastic composition through an orifice with a width or diameter of from 10 μm to 1000 μm to obtain one or more microextruded elements; and
  (iii) stacking the two or more layers comprising microextruded elements in such a way that a vertical section of the edible microextruded product shows intersected microextruded elements within a layer, or microextruded elements superimposed and differentially oriented between the different layers; or alternatively the two or more layers are stacked in such a way that microextruded elements between layers are oriented in parallel.

Clause 15. Use of an edible microextruded product as defined in any one of clauses 1-13, as a meat replacer.

Clause 16. Edible viscoelastic microextrudable composition comprising, in an appropriate edible solvent, protein in a percentage by weight in relation with the total weight of the viscoelastic composition from 19% to 49%, said protein selected from plant-origin protein, insect protein, algae-origin protein, bacterial origin protein, and combinations thereof; and an edible pseudoplastic polysaccharide selected from alginate, xanthan gum, glycosaminoglycans, agarose, gellan gum, and combinations thereof, in a percentage by weight, in relation with the total viscoelastic composition, from 0.5% to 40%; and wherein the viscoelastic composition comprises at least 45% by weight of edible solvent, in relation with the total weight of the composition.

Clause 17.—The edible viscoelastic microextrudable composition according to clause 16, which has a storage modulus G' higher than the loss modulus G" when measured at 0.16 Hz and at a temperature of 23° C. in a pair of parallel serrated plates, and with a solvent amount in the edible microextrudable composition from 45% to 90% w/w, being the storage modulus G' higher than 1700 Pa and the loss modulus G" higher than 350 Pa, and wherein and the ratio G"/G' in the viscoelastic composition being from 0.24 to 0.88.

CITATION LIST

Patent Literature

U.S. Pat. No. 9,808,029-B2 (2017)
U.S. Pat. No. 8,703,216-B2 (2014)
US Patent Application US2016135493-A1 (2016)

Non Patent Literature

Krintiras et al. "On the use of Couette Cell technology for large scale production of textured soy-based meat replacers", Journal of Food Engineering-2016, vol. no. 169, pp.: 205-213.
Lille et al., "Applicability of protein and fibre-rich food materials in extrusion-based 3D printing", Journal of Food Engineering-2017, http://dx.doi.org/10.1016/j.jfoodeng.201704.034.
Ogawa et al., "Measurement of Young's Modulus and Poisson's Ratio of Tuna Fish". Transactions of the Japan Society of Refrigerating and Air Conditioning Engineers, Volume 9, Issue 3, pp. 283-290 (2011).
M-R. Lapin et al. "Substrate elasticity affects bovine satellite cell activation kinetics in vitro", J Anim Sci.-2013, vol. no. 91(5), pp. 2083-2090, doi: 10.2527/jas.2012-5732.
Chen et al., "Young's modulus measurements of soft tissues with application to elasticity imaging", IEEE Transactions on Ultrasonics, Ferroelectrics, and Frequency Control, Volume 43, Issue: 1 (1996). doi: 10.1109/58.484478.
U-Chupaj et al., "Differences in textural properties of cooked caponized and broiler chicken breast meat", Science—2017, vol. no. 1; 96(7), pp.: 2491-2500. doi: 10.3382/ps/pex006.
Jahanbakhshian N et al., "Measurement and prediction of the mechanical properties of a two-component food during freezing.", International Journal of Food Properties-2017, vol. no. 20(3), pp.: S3088-S3095. doi: 10.1080/10942912.2016.1247856.
Chen E et al., "Ultrasound elasticity measurements of beef muscle" of IEEE Ultrasonics Symposium ULTSYM-94, Vol. 3, (1994), 1459-1462. doi: 10.1109/ULTSYM.1994.401867.
Segars R et al., "Textural characteristics of beef muscles, Journal of Texture Studies 5 (1974) 283-297. doi: 10.1111/j.1745-4603.1974.tb01436.x

The invention claimed is:

1. A process for the manufacturing of an edible microextruded. product comprising two or more layers of viscoelastic microextruded elements, wherein each extruded element comprises protein, an edible pseudoplastic polymer and an appropriate edible solvent, comprising the steps of:
   (i) providing a viscoelastic composition comprising:
      an appropriate edible solvent,
      protein, and
      an edible pseudoplastic polymer,
         wherein said viscoelastic composition comprises a percentage by weight of protein from 19% to 49% and a percentage by weight of edible pseudoplastic polymer from 0.2% to 40%,
         wherein the edible solvent is at least 45% by weight, said edible solvent balancing up to 100% by weight of the viscoelastic composition;
   (ii) microextruding the viscoelastic composition through an orifice with a width of from 10 μm to 1000 μm to obtain one or more microextruded elements; and
   (iii) stacking the two or more layers comprising microextruded elements in such a way that a vertical section of the edible microextruded product shows intersected microextruded elements within a layer, or microextruded elements superimposed and differentially oriented between the different layers; or alternatively the two or more layers are stacked in such a way that mixcroextruded elements between layers are oriented in parallel.

2. The process according to claim 1, further comprising after any one of steps (ii) and (iii), a step (iv) of adding one or more additives selected from the group consisting of emollients, flavor compounds, aromatizing compounds, lipids, colorants, metal chelants, oligoelements, vitamins, mineral salts, cells, extracts of said cells, combinations of all these compounds, cells, cell extracts, and combinations thereof.

3. The process according to claim 1, further comprising after any one of steps (ii) and (iii), a step (v) of adding between microextruded elements within a layer and/or on a layer of microextruded elements, a composition comprising a fat selected from the group consisting of triglycerides, cholesterol, phospholipids, fatty acids, and combinations thereof; and/or a composition comprising cartilaginous material; and/or a composition comprising bone material.

4. The process according to claim 1, wherein the viscoelastic composition comprises, an edible pseudoplastic polymer, a percentage by weight of protein from 19% to 49% w/w, a percentage by weight of edible pseudoplastic polymer from 0.2% to 40% and at least 45% w/w of an edible solvent, said solvent balancing up to 100% w/w of the viscoelastic composition, said viscoelastic composition having a homogeneous distribution of particle sizes from lower than 6 μm to lower than 600 μm, and being produced by:
   (a) mixing the protein, the edible pseudoplastic polymer and the edible solvent in a container; and
   (b) applying agitation at a centrifugal force from 10 g to 4000 g, optionally in more than one direction, while raising the temperature from 20° C. to a temperature lower than 95° C., and maintaining agitation and temperature for a period of time from 1 minute to 30 minutes.

5. The process according to claim 1, wherein the viscoelastic composition comprises:
   a storage modulus G' higher than the loss modulus G" when measured at a frequency of 0.16 Hz and at a temperature of 23° C. in a pair of parallel serrated plates; and
   a solvent amount in the edible microextrudable composition from 45% to 90% w/w;
   wherein the storage modulus G' is equal to or higher than 1700 Pa and the loss modulus G" is equal to or higher than 350 Pa, and
   wherein the ratio G"/G' in the viscoelastic composition is from 0.24 to 0.88.

6. The process according to claim 1, wherein the percentage by weight of protein is from 25% to 49%, and the percentage by weight of edible solvent is at least 45%.

7. The process according to claim 1, wherein the protein is selected from the group consisting of animal origin protein, plant origin protein, algae origin protein, yeast origin protein, bacterial origin protein, and combinations thereof.

8. The process according to claim 7, wherein the protein is selected from the group consisting of plant origin protein, algae origin protein, yeast origin protein, bacterial origin protein, and combinations thereof.

9. The process according to claim 7, wherein the protein is animal protein.

10. The process according to claim 9, wherein animal protein is insect protein.

11. The process according to claim 1, wherein the edible pseudoplastic polymer is selected from the group consisting of a polysaccharide, a pseudoplastic protein, and combinations thereof.

12. The process according to claim 1, wherein the viscoelastic composition further comprises cells and/or extracts of said cells.

13. An edible microextruded product produced by a method as defined in claim 1, comprising two or more layers of viscoelastic microextruded elements and wherein the compressive elastic modulus of the edible microextruded product is from $1.0 \times 10^3$ Pa to $5.0 \times 10^6$ Pa and the tensile Young's modulus of the edible microextruded product is from $5.0 \times 10^3$ Pa to $11.0 \times 10^6$ Pa, said compressive elastic and the tensile Young's moduli measured in a servo-hydraulic test system with a clamp displacement rate equal to 1 mm/min, at 23° C. and with a solvent amount in the edible microextruded product from 45% to 90% w/w.

14. The edible microextruded product according to claim 13, wherein the microextruded elements are selected from the group consisting of microextruded sheets, microextruded filaments, and combinations thereof.

15. The edible microextruded product according to claim 13, comprising between two or more of the microextruded elements of each layer and/or between one or more of the layers of microextruded elements, a composition comprising a fat selected from the group consisting of triglycerides, cholesterol, phospholipids, fatty acids, and combinations thereof; and/or a composition comprising cartilaginous material; and/or a composition comprising bone material.

16. An edible viscoelastic microextrudable composition comprising:
   in an appropriate edible solvent, protein in a percentage by weight from 19% to 49%, said protein selected from the group consisting of plant-origin protein, insect protein, algae-origin protein, bacterial origin protein, and combinations thereof; and
   an edible pseudoplastic polysaccharide selected from the group consisting of alginate, xanthan gum, glycosaminoglycans, agarose, gellan gum, pectin, carrageenan, and combinations thereof, in a percentage by weight from 0.5% to 40%;
   wherein the viscoelastic composition comprises at least 45% by weight of the edible solvent.

17. The edible viscoelastic microextrudable composition according to claim 16, comprising:
   a storage modulus G' higher than the loss modulus G" when measured at a frequency of 0.16 Hz and at a temperature of 23° C. in a pair of parallel serrated plates; and
   a solvent amount from 45% to 90% w/w,
   wherein the storage modulus G' is higher than 1700 Pa and the loss modulus G" is higher than 350 Pa, and
   wherein the ratio G"/G' in the viscoelastic composition is from 0.24 to 0.88.

18. A viscoelastic microextrudable composition comprising:
   an edible pseudoplastic polymer in an amount by weight from 0.2% to 40%,
   a percentage by weight of protein from 19% to 49% w/w, and
   at least 45% w/w of an edible solvent, said solvent balancing up to 100% w/w of the viscoelastic composition,
   wherein the viscoelastic composition has a homogeneous distribution of particle sizes from lower than 6 μm to lower than 600 μm, and
   wherein the viscolelastic composition is produced by:
      (a) mixing the protein, the edible pseudoplastic polymer and the edible solvent in a container; and
      (b) applying agitation at a centrifugal force from 10 g to 4000 g, optionally in more than one direction, while raising the temperature from 20° C. to a temperature lower than 95° C., and maintaining agitation and temperature for a period of time from 1 minute to 30 minutes.

19. An edible composite product comprising a portion of the edible microextruded product according to claim 13, and a portion of a solidified composition comprising a fat selected from the group consisting of triglycerides, cholesterol, phospholipids, fatty acids, and combinations thereof; and/or a portion of a solidified composition comprising cartilaginous material; and/or a portion comprising bone material, said portion of composition comprising fat and/or cartilaginous material and/or bone material, adjacently and in contact with the portion of the edible microextruded product.

* * * * *